United States Patent
Guo et al.

(10) Patent No.: US 6,867,949 B1
(45) Date of Patent: Mar. 15, 2005

(54) VIBRATION-DAMPED PUSH-PIN ASSEMBLY FOR DISK DRIVE SERVO WRITING

(75) Inventors: Lin Guo, Milpitas, CA (US); David M. Tung, Livermore, CA (US); Xiaoping Hu, San Jose, CA (US); Wei Guo, Fremont, CA (US); William M. Marvin, Jr., Loveland, CO (US); Mark S. Seymour, Felton, CA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 10/053,934

(22) Filed: Jan. 22, 2002

Related U.S. Application Data

(60) Provisional application No. 60/284,975, filed on Apr. 19, 2001.

(51) Int. Cl.[7] .................................................. G11B 5/55
(52) U.S. Cl. .................... 360/265.6; 384/611; 267/136
(58) Field of Search ................................ 267/136, 134, 267/140.11, 140.3, 141, 141.2, 141.3; 360/265.6, 266.1; 384/611, 536

(56) References Cited

U.S. PATENT DOCUMENTS

| | | | | |
|---|---|---|---|---|
| 4,602,233 A | | 7/1986 | Pavlovsky et al. .......... 335/258 |
| 5,491,598 A | * | 2/1996 | Stricklin et al. ......... 360/265.6 |
| 5,666,242 A | * | 9/1997 | Edwards et al. ......... 360/265.6 |
| 5,727,882 A | * | 3/1998 | Butler et al. ................. 384/611 |
| 5,774,294 A | | 6/1998 | Fioravanti ..................... 360/75 |
| 5,783,752 A | | 7/1998 | Thorburn ...................... 73/800 |
| 5,796,542 A | | 8/1998 | Szeremeta ............... 360/77.02 |
| 5,914,837 A | * | 6/1999 | Edwards et al. ......... 360/265.6 |
| 5,930,071 A | * | 7/1999 | Back ......................... 360/97.01 |
| 5,980,487 A | * | 11/1999 | Jones et al. ................. 604/110 |
| 6,018,441 A | * | 1/2000 | Wu et al. ................. 360/265.6 |
| 6,147,831 A | | 11/2000 | Kennedy et al. .............. 360/75 |
| 6,239,943 B1 | * | 5/2001 | Jennings et al. ......... 360/97.02 |
| 6,480,363 B1 | * | 11/2002 | Prater ....................... 360/265.7 |
| 6,505,968 B1 | * | 1/2003 | Fleury et al. .................. 384/1 |
| 2002/0053251 A1 | * | 5/2002 | Bernard et al. | |

* cited by examiner

*Primary Examiner*—Matthew C. Graham
(74) *Attorney, Agent, or Firm*—Marsh Fischmann & Breyfogle LLP

(57) ABSTRACT

The present invention is directed to a push-pin assembly for use with a positioning arm of a disk drive servo writer. The push-pin assembly promotes vibrational damping between the push-pin assembly and the actuator arm. Push-pin assemblies of the invention generally include a contact pin having a shaft and a contact head. The push-pin assembly also includes a body having a contact pin receptacle recessed into an end so that at least a portion of the contact pin shaft can be disposed in the receptacle. The contact head is thus disposed beyond the end of the body which includes the contact pin receptacle. The push-pin assembly additionally includes a vibration damper disposed between at least a portion of the contact pin shaft and the body.

54 Claims, 11 Drawing Sheets

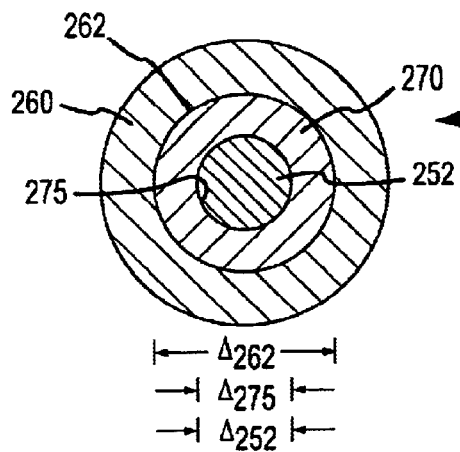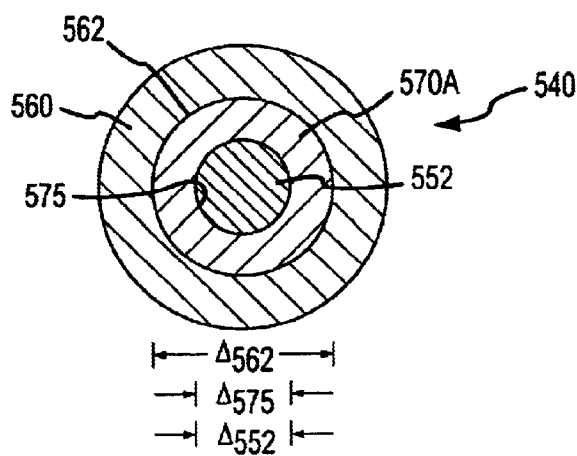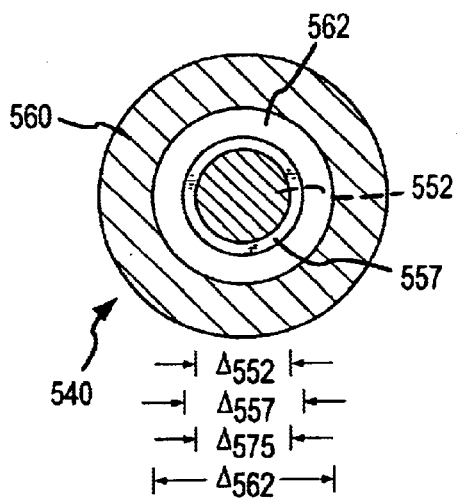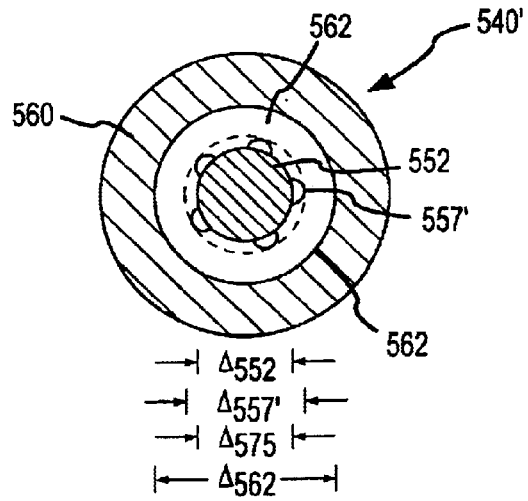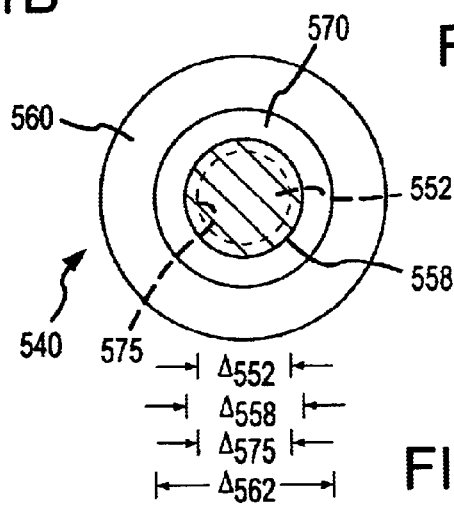

| | DRIVE 1 | DRIVE 2 | DRIVE 3 | DRIVE 4 | DRIVE 5 |
|---|---|---|---|---|---|
| OLD PUSH-PIN | 3.35 | 2.45 | 1.75 | 2.36 | 2.4 |
| NEW PUSH-PIN | 3.01 | 1.80 | 1.11 | 2.17 | 2.09 |

VIBRATION-DAMPED PUSH-PIN ASSEMBLY FOR DISK DRIVE SERVO WRITING

RELATED APPLICATION

This application claims priority under 35 USC 119(e) to U.S. Provisional Application No. 60/284,975 entitled Intelligent Push-pin Design for High TPI Hard Disk Drive Servo Writing filed Apr. 19, 2001, which is incorporated herein by reference in its entirety.

FIELD OF THE INVENTION

The present invention generally relates to disk drive manufacturing. More particularly, the present invention relates to the servo writing process of disk drive manufacturing in which a push-pin assembly comes into contact with an actuator arm assembly. The push-pin assembly has special features that reduce the effects of vibration from the disk drive.

BACKGROUND OF THE INVENTION

Nearly every desktop computer and server in use today contains one or more disk drives. These disk drives function to store digital information on a magnetic medium. Conventional disk drives typically include a base plate and a cover that is detachably connected to the base plate to define a housing for various disk drive components. One or more data storage disks are generally mounted on a spindle which is interconnected with the base plate and/or cover so as to allow the data storage disk(s) to rotate relative to both the base plate and cover via a spindle motor. An actuator arm assembly (such as a single actuator arm, a plurality of actuator arms, or an E-block having a plurality of actuator arm tips), is interconnected with the base plate and/or cover by an appropriate bearing or bearing assembly so as to enable the actuator arm assembly to pivot relative to one or more of the base plate, cover, and the data storage disk(s) in a controlled manner.

A suspension or load beam may be provided for each data storage surface of each data storage disk. Typically each disk has two of such surfaces. All suspensions are appropriately attached to and extend away from the actuator arm assembly in the general direction of the data storage disk(s). A transducer, such as a read/write head, is disposed on the free end of each suspension for purposes of measuring/writing signals with the corresponding data storage disk. The position of the actuator arm assembly, and thereby each transducer, is controlled by a voice coil motor or the like which pivots the actuator arm assembly to position the transducer(s) at the desired radial position of the data storage disk.

Each data storage disk has a plurality of concentrically disposed tracks which are available for data storage. These tracks are formed on the data storage disk(s) after they have been enclosed in the space between the cover and base plate. One way in which this is accomplished is by including a push-pin hole on the base plate of the disk drive. Formation of the tracks on the data storage disk(s) of the disk drive entails directing a push-pin through this push-pin hole in the disk drive base plate and into engagement with the actuator arm assembly. This push-pin is part of a servo writer which moves the push-pin in a controlled manner to a position where the actuator arm assembly is disposed for writing a track on the disk(s) at a specific radial location on the disk(s) via the relevant read/write head.

It is important to precisely control the position of the actuator arm assembly while the servo information fields are written to the disk surfaces. However, system resonances can arise, for example, from vibrations generated by the operation of the spindle motor during rotation of the data storage disk(s). Of particular interest are resonances which occur locally at the push-pin and actuator arm assembly, as such resonances are most likely to affect the position of a read/write element on the actuator arm assembly interfacing the disk(s) where servo information fields are read and/or written. Steps have been taken to reduce these resonances, including efforts to stiffen the push-pin and the associated push-pin assembly, as well as installing a soft, energy-absorbing material between the push-pin and the actuator arm assembly. However, to date such efforts have not been completely successful in eliminating the effects of resonances during the writing of the servo information without adding additional complications to the process. For instance, such energy-absorbing material greatly increases the incidence of stiction which can potentially cause unwanted track spacing and/or jumping. As track densities continue to increase, such track spacing errors in the writing and/or reading of the servo information will increasingly prove problematic during disk drive operations.

Thus, a need exists for an improved approach to reducing the resonances from a disk drive servo track writer, via the push-pin, in order to reduce or eliminate the affects of resonances which influence the position of the actuator arm assembly and hence, the location of each read/write head with respect to the desired location. At the same time, a need exists to enhance the structural characteristics and/or dynamics of the push-pin with respect to its interface with the actuator arm assembly to prevent the occurrence of stiction.

BRIEF SUMMARY OF THE INVENTION

The present invention is generally directed to positioning systems of disk drive servo writers. More specifically, the present invention is generally directed to a push-pin assembly for use with a positioning arm of a disk drive servo writer. This push-pin assembly desirably addresses at least certain vibrations which may adversely affect servo writing quality. Any appropriate type/configuration of disk drive actuator arm assembly may benefit from having servo writing operations performed using the push-pin assembly of the present invention. In addition, the push-pin assembly of the present invention may have some use in "bulk writing" applications wherein a plurality of data storage disks are generally simultaneously written while being rotated about a common spindle. Accordingly, reference herein to "servo writing" may include such bulk writing applications.

Each of the various aspects of the push-pin assembly that are associated with the present invention, that relate to the structure of the same, and that will be discussed in more detail below include a contact pin which has a shaft and a contact head disposed at one end of the shaft. The contact head has an actuator arm facing surface which engages the disk drive actuator arm assembly at any appropriate location. The push-pin assembly also includes a body/housing which is interconnectable with the positioning arm of the servo writer. The body has a contact pin receptacle that is recessed into at least one end of the body so that at least a portion of the contact pin shaft can be disposed within the contact pin receptacle (e.g., part of the contact pin shaft may extend beyond an end of the body). Thus, a portion of the body is disposed about a perimeter of at least a lower portion of the contact pin shaft. The contact head is thereby disposed at/beyond the end of the body which includes the contact pin receptacle. Further, the push-pin assembly also includes a vibration damper that is disposed between at least a longitudinal portion of the contact pin shaft and the body.

In a first aspect of the present invention, an entirety of the contact pin shaft is disposed in spaced relation to the body. As such, any vibrations of the contact pin are not transferred to the body, and thereby the positioning arm of the servo writer (or vice versa for that matter). Stated another way, the contact pin is "vibrationally isolated" from the body.

Various refinements exist of the features noted in relation to the subject first aspect of the present invention as well. Further features may also be incorporated in the subject first aspect of the present invention as well. These refinements and additional features may exist individually or in any combination. The contact pin shaft may include a protrusion of some sort that is disposed toward an end of the shaft that is opposite the contact head. The vibration damper in this embodiment may be positioned about a longitudinal portion of the shaft which is disposed between the protrusion and the contact head. The function of this particular protrusion is to retain the contact pin shaft within the body (i.e. to keep the contact pin shaft from being pulled out of the contact pin receptacle). Stated another way, the function of the protrusion is to maintain the contact pin in a set position along a longitudinal extent of the contact pin and relative to the body. A set position means that the longitudinal placement of the contact pin is preserved with respect to other components of the push-pin assembly. In one variation, this protrusion engages an end of the vibration damper so as to not allow any substantial movement of the contact pin shaft out of the contact pin receptacle. This protrusion may be of any appropriate configuration so as to function as a mechanical "catch" of sorts (e.g., annular; a plurality of radially spaced protrusion segments disposed about an annular periphery of the shaft; a single protrusion of less than annular extent).

A protrusion of sorts may be disposed on the outer periphery of the shaft at a longitudinal location that is between the contact head and the vibration damper in the first aspect. The protrusion in this embodiment maintains the contact pin head and the body in spaced or non-contacting relation (i.e., so as to prevent a "vibrational short"). Preferably, the protrusion of this embodiment generally interfaces with that end of the vibration damper that projects out of the contact pin receptacle, and is also free from contact with the body. Any appropriate configuration may be used for protrusion of this embodiment that provides the function of maintaining the contact pin head and the body in non-contacting relation (e.g., an annual "shoulder"; a plurality of radially spaced segments).

Vibration dampers utilized in push-pin assemblies of the first aspect may exhibit various configurations. Any given vibration damper may be annular or disposed about the entire perimeter of a corresponding longitudinal portion of the contact pin shaft. Another option is for any such vibration damper to be defined by a plurality of radially spaced (relative to the longitudinal extent of the contact pin shaft) vibration damper segments. Appropriate materials for any such vibration damper include piezoelectric materials (including both polymers and ceramics), urethane and polyurethane materials (such as TYGON® manufactured by Saint-Gobain Performance Plastics of Wayne, N.J., ISODAMP® manufactured by E-A-R Specialty Composites of Indianapolis, Ind., and PORON® manufactured by Rogers Corporation of Rogers, Conn.), other appropriate damping materials, and combinations thereof.

In one embodiment of the first aspect, the push-pin assembly includes first and second vibration dampers which are spaced along a longitudinal extent of the contact pin shaft. The first vibration damper can have a modulus of elasticity which is less than, at least substantially equal to, or greater than a corresponding modulus of elasticity of the second vibration damper. Additionally, the first vibration damper can be formed from the same or different material than the second vibration damper. At least one of the first and second vibration dampers may be formed from one or more piezoelectric materials. An appropriate signal may then be directed to such a vibration damper to change at least one physical property of this vibration damper in response to an appropriate monitoring operation, for instance to cause such a vibration damper to expand or contract in size to affect the damping properties of the vibration damper and/or the position of the contact pin shaft relative to the body.

The contact pin receptacle of the first aspect may include first and second longitudinal receptacle sections. The first receptacle section may have a larger effective diameter than that of the second receptacle section. In other words, a first spacing between a first wall of the first receptacle section and the contact pin shaft can be greater than a second spacing between a second wall of the second receptacle section and the contact pin shaft. In one embodiment, a first vibration damper is disposed in the first receptacle section. In this case, a length of the first vibration damper may be less than a length of the first receptacle section. The second receptacle section can be located between the first receptacle section and a second vibration damper that is longitudinally spaced from the noted first vibration damper. In any case, the contact pin shaft may generally sequentially extend through the first receptacle section and at least partially within the second receptacle section.

The push-pin assembly of the first aspect may also provide for a monitoring of a position of the contact pin shaft relative to the body. This may be used for any appropriate purpose, including to determine if the push-pin assembly has failed in at least some respect and should be replaced, to identify when the position of the contact pin shaft relative to the body needs to be somehow adjusted, to identify at least a potential problem with the current servo writing operation, or the like. In any case and in one embodiment, this monitoring is effected using an electrical switch. The lower portion of the contact pin shaft may be a first switch contact element, and an inner wall of the contact pin receptacle may be a second switch contact element. The first and second switch contact elements may be monitored to determine if the electrical switch is an open condition/position or a closed condition/position, or to simply determine if there is a change in the switch condition/position. An open condition/position means that the contact pin (first switch contact element) does not touch any portion of the body (second switch contact element) of the push-pin assembly so that the contact pin is electrically isolated from the body of the push-pin assembly. Conversely, a closed condition/position for the switch means that the contact pin touches at least a portion of the body (i.e. closing the circuit) so as to enable an electric current to flow from one of the contact pin and body to the other. In order to be able to function as a switch, obviously an electrical power source must be connected to one of the contact pin and the body via electrically conductive wiring or the like, and another electrically conductive wire or the like must connect (either directly or indirectly) the other of the contact pin and body to a ground or remaining post of the power source. Preferably, the vibration damper is irk also an electrical insulator in this case.

In another embodiment of the first aspect, the above-noted monitoring is effected using a capacitive sensor. The lower portion of the contact pin shaft and the body may be respective first and second conductors of the capacitive sensor, and an open area between the first and second conductors may be the dielectric of the capacitive sensor. An open area means an area between the contact pin shaft and the body that is devoid of any material. When there is a change in the position of the lower portion of the contact pin shaft relative to the body, there will be a corresponding change in capacitance. The monitoring of capacitance requires that the contact pin be electrically isolated from the body, and therefore any vibration damper is also preferably an electrical insulator as well. However, while electrical isolation of the contact pin requires that electrical current cannot pass between the body and the contact pin, electrical isolation of the contact pin does allow electrical fields to pass between the body and the contact pin through the open area.

The capacitance-based monitoring of the position of the contact pin shaft again may be used for any purpose. For instance, the monitoring of capacitance may be used to identify a failure of the push-pin assembly. Failure of the push-pin can be defined as a deviation from an acceptable tolerance range of capacitance. The vibration damper wearing out, degrading, compressing, or the like can cause such a deviation, for example. A bending or a change in contour of the contact pin can also cause the noted capacitive deviation. The capacitive deviation can basically include any factor(s) that would cause a portion of the contact pin to approach and/or contact the body. One option is to use a detection of the noted capacitive deviation for determining when to replace the push-pin assembly. Another option is to take remedial actions of sorts. In this regard, once the noted capacitive deviation has been identified, an appropriate signal (e.g., electrical) can be applied to at least one vibration damper to adjust at least one property of the vibration damper(s) in response to the deviation from the acceptable tolerance range of capacitance. Such an adjustment of the vibration damper(s) may reposition the contact pin shaft relative to the body to allow for continued use of the push-pin assembly (e.g., the vibration damper may expand to force the contact pin back into the center of the contact pin receptacle, thus restoring the monitored capacitance level back to within the acceptable tolerance range).

In a second aspect of the present invention, a vibration damper of the push-pin assembly is disposed between at least a first longitudinal segment of the lower portion of the contact pin shaft and the receptacle wall of the body, and an open area separates a second longitudinal segment of the lower portion of the contact pin shaft from the receptacle wall of the body. The second longitudinal segment of the contact pin shaft is disposed further within the contact pin receptacle than the first longitudinal segment. Those various features discussed above in relation to the first aspect of the present invention may be incorporated in variations of this second aspect of the present invention as well, and in the manner noted above.

In a third aspect of the present invention, the push-pin assembly has a contact pin shaft that includes a first protrusion that is spaced from the contact head. A vibration damper is disposed about a longitudinal portion of the contact pin shaft at a location that is between the contact head and the first protrusion.

Various refinements exist of the features noted in relation to the subject third aspect of the present invention as well. Further features may also be incorporated in the subject third aspect of the present invention as well. These refinements and additional features may exist individually or in any combination. One way of characterizing the first protrusion of the contact pin shaft is that it has an effective diameter that is larger than an effective diameter of an aperture in the vibration damper through which the contact pin shaft extends. The effective diameter of the contact pin shaft is generally the largest cross-sectional distance across the shaft at the noted location. On the other hand, the effective diameter of the noted aperture in the vibration damper is approximately the largest cross-sectional distance across this aperture (whether defined by a single hole through a single vibration damper or by a space collectively defined by a plurality of radially spaced vibration damper segments). In one embodiment of the third aspect, the first protrusion of the contact pin shaft engages a first end surface of a vibration damper so that the first protrusion prevents the shaft from being pulled out from within the contact pin receptacle. Any configuration for the first protrusion that provides this "mechanical catch" function may be utilized.

The contact pin shaft associated with the third aspect may include a second protrusion that is disposed between the contact head and the portion of the contact pin shaft that longitudinally interfaces with the noted vibration damper. Generally, this second protrusion functions as a spacer of sorts between the contact head and the body of the push-pin assembly, or so as to keep the contact head and the body in non-contacting relation. The second protrusion preferably interfaces with an end of the vibration damper that is projecting out the open end of the body through which the contact pin extends in the direction of the contact head, and is free from contact with the body. In one embodiment, both the first and second protrusions interface with opposite ends of the noted vibration damper. Preferably, both the first and second protrusions on the contact pin shaft are free from contact with the body. As with the first protrusion, the second protrusion can be of any appropriate configuration to provide the above-noted function.

A fourth aspect of the invention is embodied in a push-pin assembly having a contact pin which includes a protrusion on the contact pin shaft that is located between the contact head and the vibration damper which is disposed about at least a longitudinal portion of the contact pin shaft. The discussion above regarding this particular feature in association with the first and third aspects may be incorporated into this fourth aspect as well.

In a fifth aspect of the present invention, the push-pin assembly includes first and second longitudinally spaced vibration dampers that are disposed between the lower portion of the contact pin shaft and the receptacle wall of the body (e.g., two or more spaced dampers). At least a portion of the contact pin shaft longitudinally oriented between the first and second vibration dampers is separated from the receptacle wall by an open area (i.e., devoid of any material). A portion of the contact pin shaft opposite the contact head extends within/beyond an end of both the first and second vibration dampers within the contact pin receptacle.

Various refinements exist of the features noted in relation to the subject fifth aspect of the present invention as well. Further features may also be incorporated in the subject fifth aspect of the present invention as well. These refinements and additional features may exist individually or in any combination. In one embodiment, the first and second vibration dampers are electrical insulators. In this case, the lower portion of the contact pin shaft and the receptacle wall may include/define first and second conductors of a capacitive sensor, and the open area between the contact pin shaft and the receptacle wall may define a dielectric of such a capacitive sensor. This capacitive sensor may be used to provide the above noted monitoring function and for the above-noted purpose(s). As such and in one embodiment, at least one of the first and second vibration dampers may be made up of a piezoelectric material. Again, sending an electrical signal to this piezoelectric material-based vibration damper may be used to change at least one physical property of the piezoelectric material in response to the identification of a predetermined change in capacitance.

In a sixth aspect, the present invention is embodied in a push-pin assembly having first and second longitudinally spaced vibration dampers that are at least partially disposed in the contact pin receptacle between the contact pin shaft and the body. A fulcrum exists on the receptacle wall of the body, and is disposed at a longitudinal position that is between the first and second dampers. This fulcrum contacts part of the lower portion of the contact pin shaft. Generally, the fulcrum may be of any appropriate configuration that defines a predetermined pivot axis for the contact pin relative to the body.

A seventh aspect of the present invention is embodied in a method for executing servo writing operations using a push-pin assembly. The method includes the step of monitoring at least some condition of the push-pin assembly. Representative conditions in accordance with the seventh aspect include, but are not limited to, the positioning of the contact pin relative to the body, the structural and/or functional integrity of the vibration damper(s), and the configuration of the contact pin shaft relative to an initial configuration of the contact pin shaft (e.g., to identify any bending of the shaft).

Various refinements exist of the features noted in relation to the subject seventh aspect of the present invention as well. Further features may also be incorporated in the subject seventh aspect of the present invention as well. These refinements and additional features may exist individually or in any combination. The method of the seventh aspect can include the step of detecting a failure of the push-pin assembly using the monitoring step. Failure of the push-pin assembly includes, but is not limited to, bending or other deformation of the contact pin, and/or breakdown and/or malfunction of the vibration damper(s). The method can also include the step of applying a signal to at least one vibration damper (e.g., a vibration damper made from active piezoelectric material) to change the position of the contact pin shaft relative to the body, all in response to the noted monitoring. The signal that is applied may be electrical, and may be applied to a piezoelectric material that forms a given vibration damper. One example of the result achieved by this signal is that it may be used to reposition the contact pin shaft away from the receptacle wall of the body, to in turn promote vibrational isolation of the contact pin shaft from the body.

In one embodiment of the seventh aspect, the push-pin assembly is utilized as an electrical switch where the above-noted monitoring includes determining whether the electrical switch is in one of an open condition/position or a closed condition/position. A change in condition/position of the switch of the push-pin assembly can be identified, depending on the desired use, by electrically detecting that the switch has changed from an open or closed condition/position, or vice versa. Another embodiment of the seventh aspect uses a push-pin assembly as a capacitive sensor. A change in the condition of the push-pin assembly can be identified when the monitored capacitance level of the push-pin assembly fails to fall within an acceptable tolerance range, or stated another way, when there is predetermined change in capacitance. Both of the switch-based and capacitance-based monitoring may be used to control provisioning of an appropriate signal to one or more vibration dampers to change at least one physical characteristic thereof. Switch and/or capacitance embodiments of the invention are designed to monitor a condition(s) of the push-pin assembly. Any "action" discussed herein that is undertaken in response to the noted monitoring is included merely for illustrative purposes. Accordingly, the monitoring function of these embodiments, and the structures of the push-pin assemblies associated therewith, are the important features of such embodiments.

Various features discussed above in relation to one or more of the seven aspects of the present invention may be incorporated into any of the other aspects of the present invention as well, and in the manner noted above.

BRIEF DESCRIPTION OF THE DRAWINGS

FIG. 6C is a cross-sectional view of the push-pin assembly of FIG. 6A taken along line 6C—6C.

FIG. 11A is a cross-sectional view of the push-pin assembly of FIG. 10 taken along line 11A—11A.

FIG. 11B is a cross-sectional view of the push-pin assembly of FIG. 10 taken along line 11B—11B.

FIG. 11C is a cross-sectional view of the push-pin assembly of FIG. 10 similar to FIG. 11B, but with an alternative configuration of the mechanical catch for the contact pin.

FIG. 11D is a cross-sectional view of the push-pin assembly of FIG. 10 taken along line 11D—11D.

DETAILED DESCRIPTION

Figure 1:
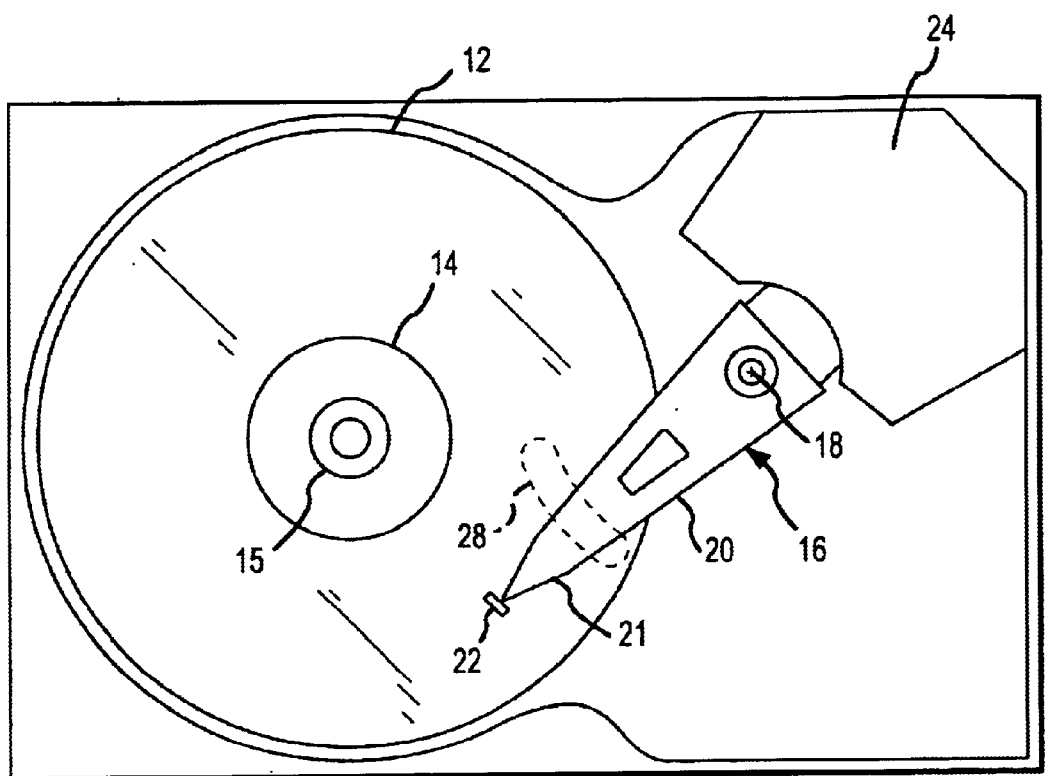
FIG. 1 is a top view of a conventional disk drive.

The present invention will now be described in relation to the accompanying drawings, which at least assist in illustrating the various pertinent features thereof. By way of initial summary, the present invention relates to disk drives and, more particularly, to disk drive servo writing operations using a push-pin assembly for positioning and maintaining the position of an actuator arm assembly of a head disk assembly, where the push-pin assembly also promotes vibrational damping between the push-pin assembly and the actuator arm assembly. Further, this push-pin assembly may provide this function while decoupling contact surface area from properties conventionally associated with the contact interface between the actuator arm assembly and the push-pin assembly of a servo-writer positioning apparatus. In other words, the invention further relates to optimizing the contact interface area between the actuator arm assembly and the push-pin assembly, effectively independent of the structural dynamics of either component.

Various embodiments of the push-pin assemblies with vibrational damping will now be discussed. Generally, each of these push-pin assemblies includes a contact pin which has a shaft and a contact head disposed at one end of the shaft. The contact head generally has an actuator arm facing surface which engages the disk drive actuator arm assembly. While this engagement of the contact head and the actuator arm assembly is preferably a metal-to-metal interface, the important aspect of the actuator arm facing surface of the contact head is providing a low frictional interface which results due to its engagement with the actuator arm assembly. Therefore, the material of the actuator arm facing surface of the contact head, while preferably metal, is not of prime importance, nor is its particular configuration.

The various embodiments of push-pin assemblies with vibrational damper hereafter described also generally include a body which is interconnectable with the positioning arm of the servo writer. The body generally has a contact pin receptacle that is recessed into at least one end of the body so that at least a portion of the contact pin shaft can be disposed in the contact pin receptacle (i.e., part of the shaft may extend beyond an opposite end of the body). Thus, a portion of the body is generally disposed about a perimeter of at least a lower portion of the contact pin shaft. The contact head is generally disposed at/beyond the end of the body that includes the contact pin receptacle. Further, the push-pin assembly also includes a vibration damper generally disposed between at least a longitudinal portion of the contact pin shaft and the body. This vibration damper can demonstrate a variety of shapes and/or configurations as long as the vibration damper functions to at least substantially resonantly isolate the contact pin from the body of the push-pin assembly. For instance, each vibration damper(s) can be at least generally tubular or may be defined by plurality of radially spaced damper segments. Any appropriate material that provides the desired vibrational damping function for a given vibration damper also may be utilized, including, but not limited to, piezoelectric materials (such as piezoelectric polymers and piezoelectric ceramics), urethane and polyurethane materials (such as TYGON®, ISODAMP®, and PORON®), other appropriate damping materials, and combinations thereof.

Figure 2:
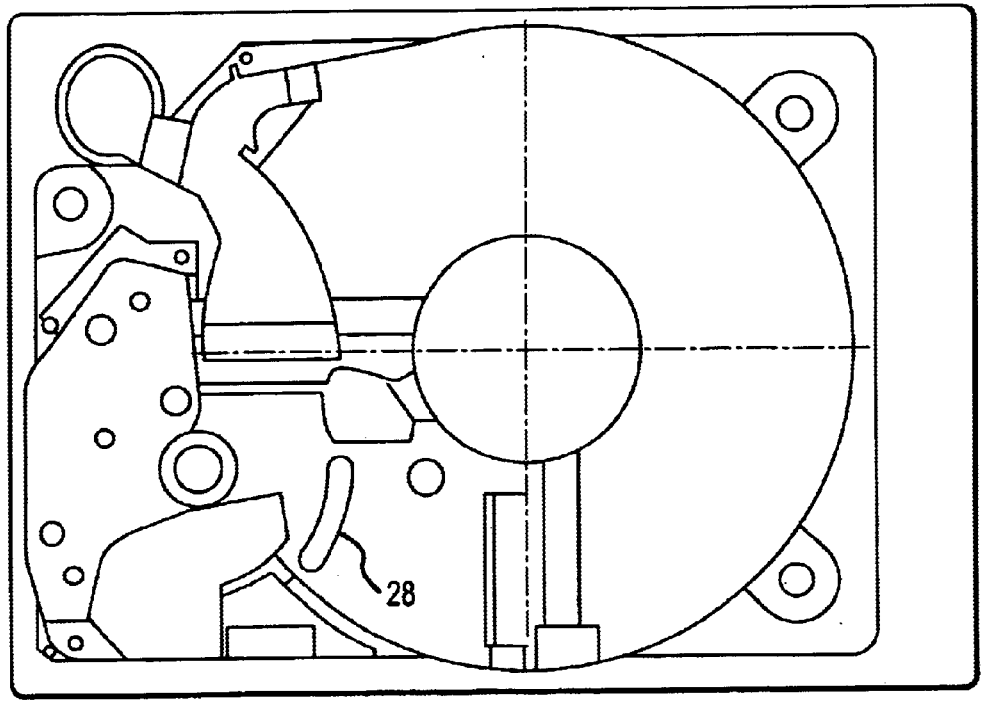
FIG. 2 is a top view of the base of the disk drive of FIG. 1, illustrating one embodiment of a push-pin hole through which at least a portion of a push-pin assembly extends for servo writing operations.

FIGS. 1–2 shows a top view of a conventional disk drive 10 that generally includes a base plate 26 and a cover (not shown) that is disposed in spaced relation thereto. The disk drive 10 includes one or more data storage disks 12 of any appropriate digital data storage media. The disk(s) 12 are mounted on a rotatable hub 14, which in turn is rotatably interconnected with the disk drive base plate 26 and/or cover. Generally, these data storage disks 12 are made from glass, ceramic, or various metals, and each data storage disk 12 preferably possesses first and second opposing disk surfaces, each typically having a plurality of concentric and annular separate tracks for storing data. A spindle motor 15 is coupled to the rotatable hub 14 to simultaneously spin the data storage disk(s) 12, preferably at a substantially constant rate. For example, current disk drives preferably spin at range of about 5,400 RPM to up to about 15,000 RPM, although embodiments outside this exemplary range are contemplated.

The disk drive 10 also includes an actuator arm assembly 16 that pivots about a pivot bearing 18, which in turn is rotatably supported by the base plate 26 and/or cover. The actuator arm assembly 16 includes one or more individual actuator arms 20 that extend out from near the pivot bearing 18. Each actuator arm 20 generally includes a suspension 21 and a head 22 disposed at or near an end of each suspension 21. The head 22 typically includes a slider and at least one transducer that exchanges signals with the corresponding data storage disk 12. While the actuator arm assembly 16 shown in FIG. 1 reflects a single actuator arm 20, the vibrationally-damped push-pin assemblies described herein are appropriate for use in positioning actuator arm assemblies of any appropriate configuration that use a push-pin assembly for servo writing operations (e.g., single actuator arm configurations; multiple actuator arm configurations, or a "stack"; an E block with a plurality of actuator arm tips).

A voice coil motor (VCM) 24 operatively interfaces with the actuator arm assembly 16 generally at an end thereof that is opposite the head 22. The VCM 24 imparts motion to the actuator arm assembly 16, and thus to the head 22 (e.g. in response to an appropriate control signal). The voice coil motor 24 generally consists of a magnet(s) and a coil of fine wire, although other configurations are contemplated. Any appropriate drive type/configuration may be used for moving the actuator arm assembly 16.

Figure 3:
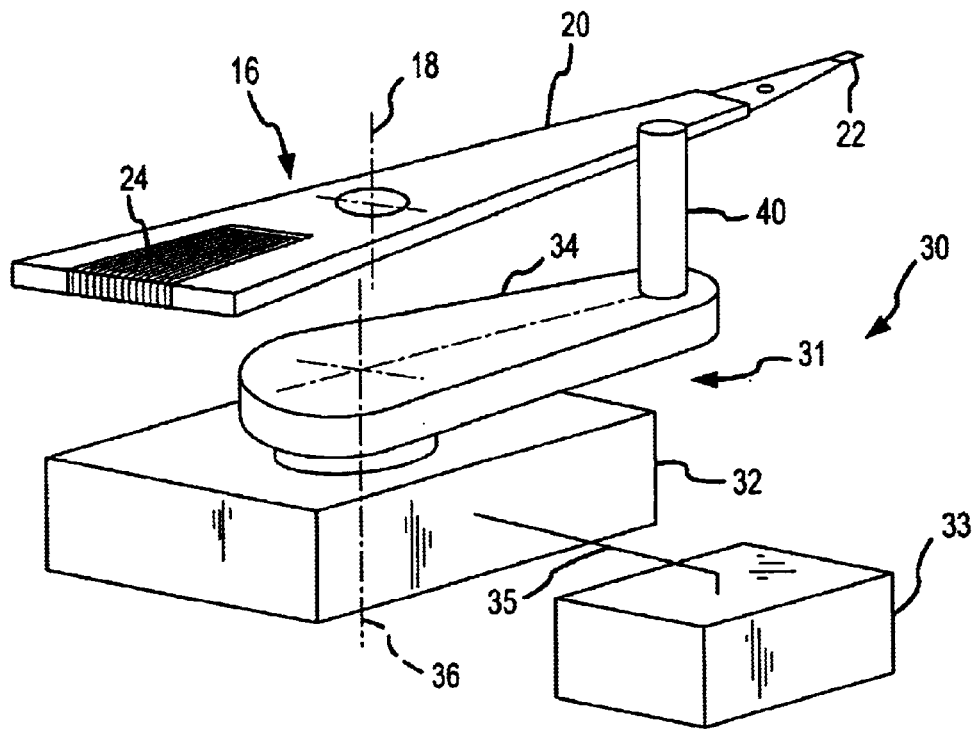
FIG. 3 is a schematic, perspective view of a positioning system of a servo writer.

FIG. 3 illustrates a servo writer 30 that includes a positioning system 31 having a platform 32 to which the components of the positioning system 31 are either directly or indirectly affixed, and a control unit 33 that is connected to the platform 32 and functioning to control servo writing functions of the servo writer 30. A first end of a positioning arm 34 is connected to the platform 32 in a manner that allows the positioning arm 34 to rotate about a positioner axis 36. At a second end of the positioning arm 34, opposite the connection to platform 32, a generically represented push-pin assembly 40 is connected to the positioning arm 34. The positioning system 31 of the servo writer 30 is designed and configured such that at least a portion of the push-pin assembly 40 fits through a push-pin hole 28 on the base plate 26 of the disk drive 10 (FIGS. 1–2). Additionally, the positioning system 31 is designed and configured such that rotation of the positioning arm 34 about the positioner axis 36 will result in movement of the corresponding push-pin assembly 40 which is unimpeded by the configuration of the push-pin hole 28 of the disk drive 10. That is, the configuration of the push-pin hole 28 at least generally approximates the path along which the push-pin assembly 40 moves during servo writing operations. Accordingly, the push-pin hole 28 can exhibit any appropriate shape/configuration that avoids significantly hindering/obstructing movement of the push-pin assembly 40 during servo writing operations.

Servo writing operations are undertaken after the above-described components of the disk drive 10 have been enclosed within a space collectively defined by the base plate 26 and the cover connected thereto. Concentrically disposed annular data storage tracks are formed on the various data storage surfaces of the disks 12 while within this enclosed space. Generally, the push-pin assembly 40 from the positioning system 31 of the servo writer 30 is positioned to protrude through the push-pin hole 28 on the base plate 26 of the disk drive 10 and into the noted enclosed space to interface with an appropriate surface of the actuator arm assembly 16. The positioning system 31 moves the push-pin assembly 40 to position the actuator arm assembly 16, to in turn dispose the head 22 at the desired radial position of its corresponding data storage disk 12 to form a track thereon. The VCM 24 of the disk drive 10 may be used to provide a resistance force in a direction opposite that of the force exerted on the actuator arm assembly 16 by the servo writer positioning arm 34 of the servo writer 30 via the push-pin assembly 40. Such a resistance force functions to maintain constant contact at the actuator arm assembly interface, and enables the servo writer positioning system 31 to position the actuator arm assembly 16 in a controlled and accurate manner. After each of the tracks has been created on a given disk 12 in this same general manner, the push-pin assembly 40 is withdrawn from the push-pin hole 28. The push-pin hole 28 is then appropriately sealed.

Still referring to FIGS. 1–3, the pivot bearing 18 of the disk drive 10 and the positioner axis 36 of servo writer positioning system 31 are preferably substantially aligned such that the push-pin assembly 40 of the positioning system 31 does not exhibit any tangential motion along the actuator arm assembly 16 during positioning of the actuator arm assembly 16 of the disk drive 10 relative to the pivot bearing 18 and the positioner axis 36. However, the pivot bearing 18 may be slightly offset or out of alignment with the positioner axis 36, thus causing some tangential motion of the push-pin assembly 40 of the positioning system 31 along the actuator arm 20 during positioning of the actuator arm assembly 16 of disk drive 10 for servo writing operations. Thus, ideally, at least that portion of the push-pin assembly 40, which actually contacts the actuator arm 20, as well as the corresponding contact surface of the actuator arm 20, are smooth and generally include one or more similar or different metals such that the friction coefficient at the push-pin assembly 40/actuator arm assembly 16 interface is of a level to effectively minimize stiction.

Figures 4, 5:
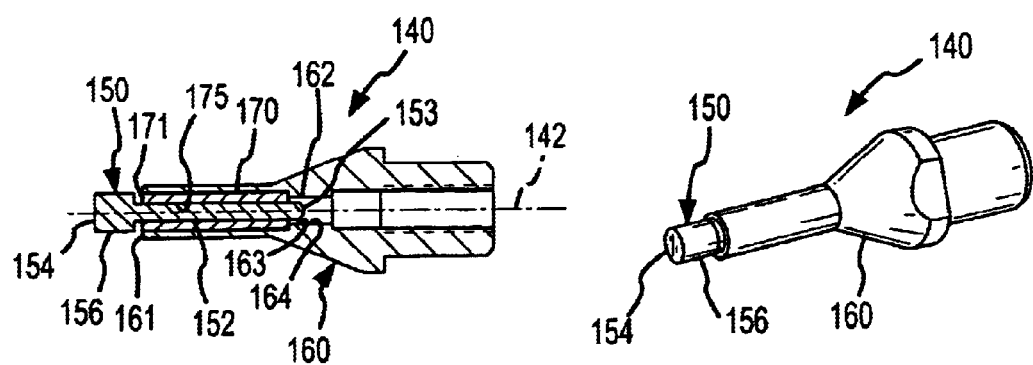
FIG. 4 is a perspective view of one embodiment of a push-pin assembly having vibrational damping.
FIG. 5 is a cross-sectional view of the push-pin assembly of FIG. 4 taken along its longitudinal extent.

Details regarding one embodiment of a push-pin assembly having desired vibrational damping characteristics, and which may be used in place of the push-pin assembly 40 of FIG. 3, are presented in FIGS. 4 and 5. The push-pin assembly 140 has a central, longitudinal axis 142, and generally includes a contact pin 150, a body 160, and a vibration damper 170. The contact pin 150 of the push-pin assembly 140 includes a shaft 152 which is preferably elongate and annular. However, the length, cross-sectional shape, and cross-sectional thickness of shaft 152 can vary depending on the desired size and function of the push-pin assembly 140. The contact pin 150 also includes a contact head 154 having an actuator arm facing surface 156 that is engageable with the actuator arm assembly 16. The contact head 154 is preferably cylindrical, or at least exhibiting an elliptical or rounded actuator arm facing surface 156, so as to enable effectively smooth and substantially continuous contact at the push-pin assembly/actuator arm assembly interface during rotational positioning of the actuator arm assembly 16 during servo writing operations (e.g. during a track "seek" function). Other embodiments are contemplated in which the contact head 150 exhibits other shapes and/or configurations (e.g., configurations which may benefit from having one or more edges/corners). Additionally, the contact pin 150 is preferably a one-piece unit which is generally formed (e.g., etched, molded, and/or machined) to meet the desired shape and function. In certain variations, an outer layer of material may be fitted around the periphery of contact head 154 to contact the surface of the actuator arm assembly 16 during positioning and/or maintenance of position of such assembly 16 for servo writing operations (e.g., a vibration damping material). However, preferably the actuator arm facing surface 156 is formed from an appropriate metal, or in any case such that there is a low frictional interface between the contact head 154 and the actuator arm assembly 16 during servo writing operations as noted above.

The body 160 of the push-pin assembly 140 is generally designed and configured to be interconnectable with the servo writer positioning arm 34 of the servo writer 30 of FIG. 3. The body 160 includes a contact pin receptacle 162 that is defined by a receptacle wall 164, where the receptacle wall 164 is at least substantially concentrically disposed about the central, longitudinal axis 142 of the push-pin assembly 140. The receptacle wall 164 may have one or more protrusion and/or recess portions which, in turn, cause variation in the size of the contact pin receptacle 162.

A vibration damper 170 of the push-pin assembly 140 is disposed along a portion of the receptacle wall 164 and functions as a resonance reducer and/or vibration dissipater. In this regard, the vibration damper 170 includes an aperture 175 through which the contact pin shaft 152 extends. Any appropriate vibration damping material may be utilized to form the damper 170 and as noted above, including but not limited to, piezoelectric materials (such as piezoelectric polymers and piezoelectric ceramics), urethane and polyurethane materials (such as TYGON®, ISODAMP®, and PORON®), other appropriate damping materials, and combinations thereof. The vibration damper 170 is tubular in shape and is complimentary sized to fit into the contact pin receptacle 162 of the body 160. In this embodiment, a first end surface 171 of the vibration damper 170 that is disposed toward the contact head 154 is in substantial alignment/coplanar with a corresponding end surface 161 of the body 160. Other relative positions of the vibration damper 170 and the end surface 161 of the body 160 may be utilized (e.g., the vibration damper 170 could extend beyond the end surface 161 of the body 160; the vibration damper 170 could be recessed relative to the end surface 161 and thereby within the contact pin receptacle 164). Notice that the contact head 154 is longitudinally disposed beyond or spaced from the end surface 161 of body 160 and the first end surface 171 of vibration damper 170. The spacing or the disposition of the contact head 154 beyond the end surfaces 171, 161 of the vibration damper 170 and body 140, respectively, is preferably about 0.5 mm, but such spacing can vary depending on the desired size of the push-pin assembly 140 and functional characteristics sought. In any case, preferably the contact head 154 is in non-contacting relation with the body 160.

In the embodiment of FIGS. 4–5, the vibration damper 170 preferably demonstrates some elasticity such that compression forces, caused by the effective diameter of the shaft 152 in combination with the effective diameter of the contact pin receptacle 162, maintain the position of the vibration damper 170, as well as the position of the shaft 152 of the contact pin 150, in the contact pin receptacle 162 of body 160. Such a design enables a technician/operator to effect a threshold pulling force on the contact pin 150 in a longitudinal direction away from the body 160 to remove a worn, faulty, and/or defective contact pin 150 and/or vibration damper 170 without having to remove the body 160 of the push-pin assembly 140 from the positioning arm 34 of the servo writer positioning system 31. However, the vibration damper 170 can also be held to the receptacle wall 164 of the contact pin receptacle 162 using one or more of adhesive, cohesive, ultrasonic bonding, heat melting, pressure, static forces, and any other means known to those of ordinary skill in the art for maintaining positioning of damper material on the receptacle wall 164. Relatedly, there may be a press fit relationship between the vibration damper 170 and the receptacle wall 164, between the vibration damper 170 and the shaft 152, or both to retain the desired relative position between the contact pin 150 and the body 160. Accordingly, the vibration damper 170 can exhibit a variety of shapes/configurations as long as it functions to at least generally isolate the contact pin 150 from the body 160.

Still referring to FIGS. 4-5, the lower portion of the shaft 152 of the contact pin 150 is disposed in the contact pin receptacle 162 of the body 160 such that the receptacle wall 164 is disposed about a perimeter of the contact pin 150. The vibration damper 170 surrounds a significant amount of that portion of the shaft 152 that is disposed within the receptacle 162, and is disposed between this portion of shaft 152 and the receptacle wall 164 to dispose this portion of the shaft 152 of the contact pin 150 in spaced relation to the body 160. An end portion 153 of the contact pin shaft 152, which is opposite the contact head 154, extends beyond and is spaced from a lower end of the vibration damper 170. However, a space 163 is still maintained between the end portion 153 of the contact pin shaft 152 and the receptacle wall 164 of the body 160. Additionally, the end portion 153 of the contact pin shaft 152 is also free from contact with any connector between the body 160 and the positioning arm 34 of the servo writer 30 (FIG. 3). Therefore, the entirety of the contact pin shaft 152 and the receptacle wall 164 do not contact each other and are maintained in spaced relation (i.e., there is no "vibrational short"). Hence, the shaft 152 (exhibiting an elongate, cylindrical configuration) of the contact pin 150 is ideally concentrically located with respect to the contact pin receptacle 162 (also being cylindrical) of the body 160 to promote vibrational isolation of the contact pin 150.

Summarily, the configuration of push-pin assembly 140 of FIGS. 4–5, allows no direct contact between the contact pin 150 and the body 160 of the push-pin assembly 140. Accordingly, such a configuration enables the push-pin assembly 140 to isolate resonance of the contact pin 150 from the body 160 of the push-pin assembly 140 and from the connected servo writer positioning system 31. Conversely, such a configuration also enables the push-pin assembly 140 to isolate resonance of the body 160 and/or servo writer positioning system 31 from the contact pin 150 which interfaces with the actuator arm assembly 16.

Figure 6A:
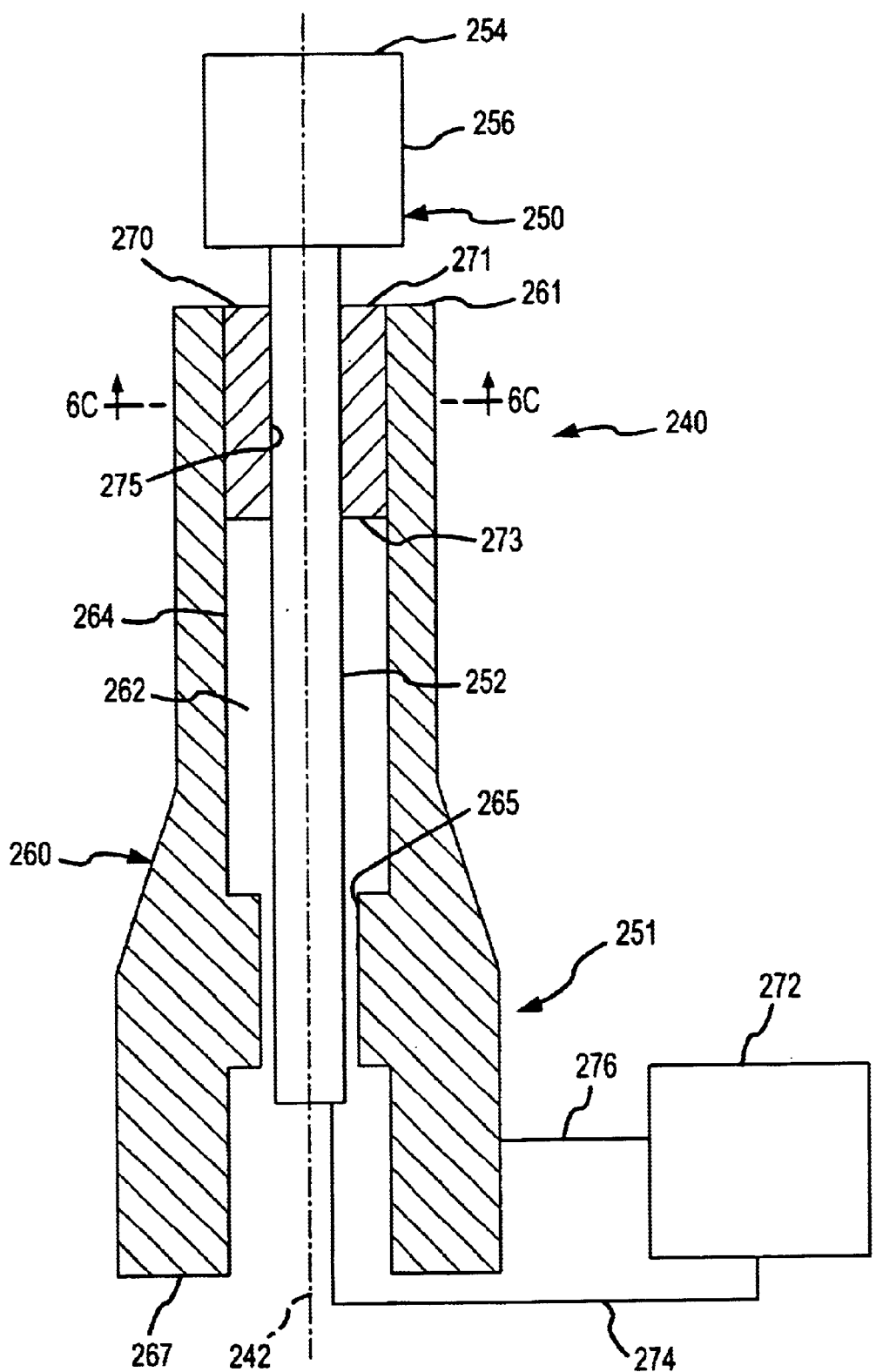
FIG. 6A is a cross-sectional view of another embodiment of a push-pin assembly with vibrational damping and which incorporates an electrical switch, illustrating the electrical switch in an open position.
Figure 6B:
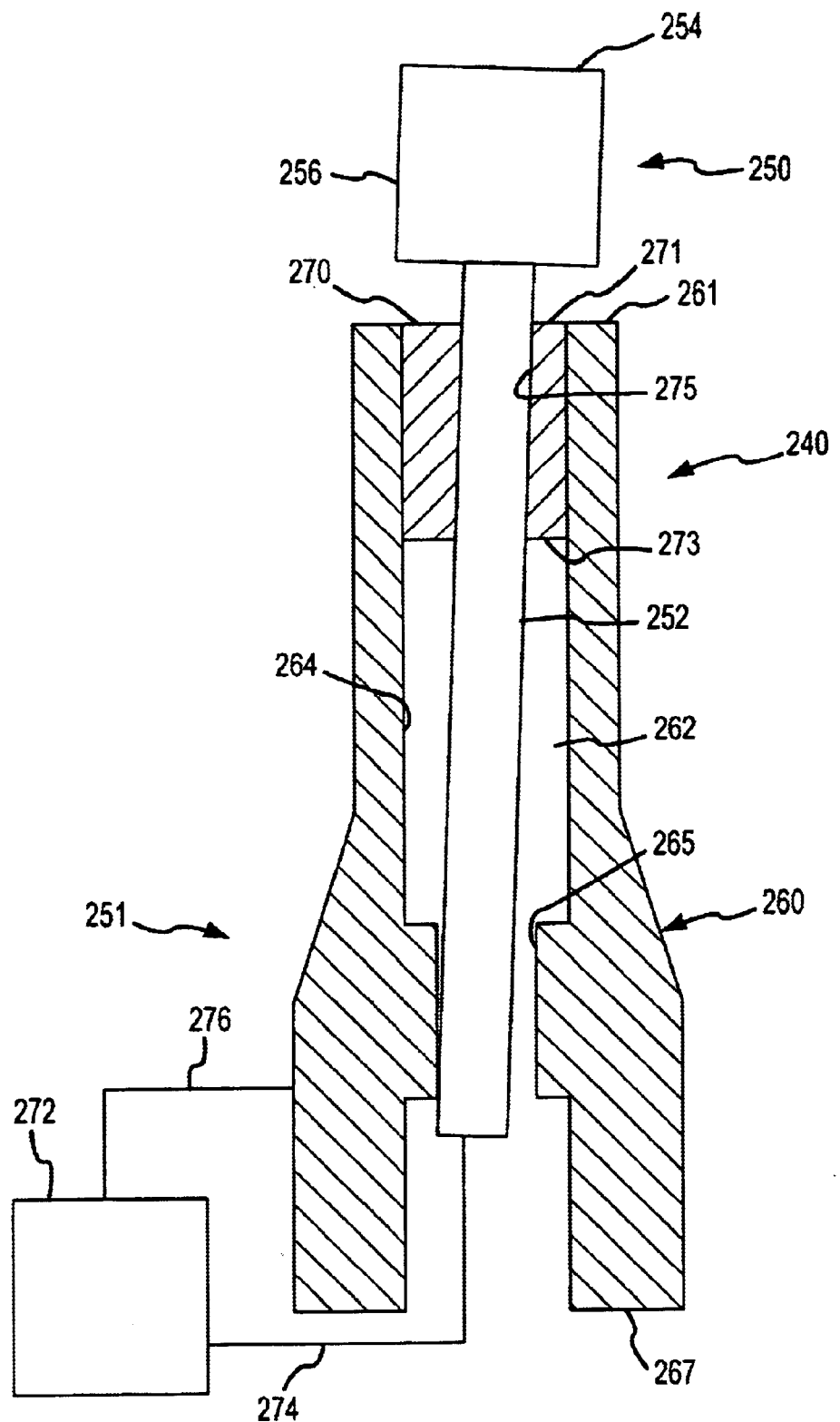
FIG. 6B is a cross-sectional view of the push-pin assembly of FIG. 6A, illustrating the switch in a closed position.

Another embodiment of a push-pin assembly having desired vibrational dampening characteristics is illustrated in FIGS. 6A–6B, and also may be used in place of the push-pin assembly 40 of FIG. 3. Turning to FIGS. 6A–6B, a push-pin assembly 240 also has a central, longitudinal axis 242, and includes a contact pin 250, a body 260, and a vibration damper 270. The contact pin 250 of the push-pin assembly 240 includes an elongate shaft 252 and a contact head 254. The body 260 includes a contact pin receptacle 262 that is defined by a receptacle wall 264, where the receptacle wall 264 is preferably disposed concentrically about the central, longitudinal axis 242 of the push-pin assembly 240. The vibration damper 270 includes an aperture 275 through which the contact pin shaft 252 extends.

The receptacle wall 264 includes an outcropping 265 that narrows the cross-sectional size of the contact pin receptacle 262 in a lower portion thereof. The vibration damper 270 of the push-pin assembly 240 is disposed along an upper portion of the receptacle wall 264 in longitudinally spaced relation to this outcropping 265. Herein the term "upper", when referring to component(s) and/or portion(s) of a push-pin assembly, refers to the respective component(s)/portion (s) disposed toward the contact head (e.g., 254) of the contact pin (e.g., 250) of the associated push-pin assembly (e.g., 250). Similarly, the term "lower", when referring to component(s) and/or portion(s) of a push-pin assembly, refers to the respective component(s)/portion(s) disposed toward an end (e.g., 267) of the body (e.g., 260) furthest from the contact head (e.g., 254) of the contact pin (e.g., 250).

FIG. 6C illustrates a cross-sectional view of the effective diameter of a number of the components of the push-pin assembly 240 of FIG. 6A taken along line 6C—6C. The shaft 252 of the contact pin 250, the contact pin receptacle 262 of the body 260, and the vibration damper 270 of the push-pin assembly 240 are shown in FIG. 6C. The effective diameters of each respective component of the push-pin assembly 240 are illustrated in FIG. 6C to illustrate the various size relationships. Accordingly, the effective diameter $\Delta_{262}$ of the contact pin receptacle 262 is defined by the receptacle wall 264 of the body 260 and is greater than an effective diameter of the shaft 252 of the contact pin 250 that extends downwardly therewithin. The outer periphery of the vibration damper 270 is designed to conform to the receptacle wall 264 of the body 260 and thereby has an outer effective diameter that is the same as the effective diameter $\Delta_{262}$ of the contact pin receptacle 262. The aperture 275 in the vibration damper 270 through which the contact pin shaft 252 extends has an effective diameter $\Delta_{275}$ that is substantially the same as the effective diameter $\Delta_{252}$ of the corresponding portion of the contact pin shaft 252 (i.e., the portion of the contact pin shaft 252 that interfaces with an inner wall of the vibration damper 270 that defines the aperture 275).

Referring back to FIGS. 6A–6B, the vibration damper 270 is tubular in shape and is complimentary sized to fit into the contact pin receptacle 262 of body 260. Additionally, the vibration damper 270 is disposed only in an upper portion of the contact pin receptacle 262 such that an upper end surface 271 of the vibration damper 270 is in substantial alignment or coplanar with an upper end surface 261 of the body 260, although such is not required and as discussed above. The contact head 254 is longitudinally disposed beyond the upper end surface 261 of the body 260 and the upper end surface 271 of the vibration damper 270, or at least is in non-contacting relation with the body 260. In this embodiment, the vibration damper 270 preferably is made of an electrical insulating material, thus providing electrical isolation with the body 260 as well as structural support for the contact pin 250.

The push-pin assembly 240 of FIGS. 6A–B not only provides desired vibrational damping characteristics, but it provides a monitoring function as well. In this regard, a first electrical connection 276 capable of carrying electrical current is connected to the body 260, and a second electrical connection 274 capable of carrying electrical current is connected to the contact pin 250, preferably at or near the lower portion of the shaft 252. The first and second electrical connections 276, 274 are connected to circuit components 272 which enable electrical current to be conducted through the push-pin assembly 240 (acting as a switch 251) when the switch 251 is in a closed position, and further enable the identification of a condition/position of the switch 251. Circuit components 272 can include, but are not limited to, a power source, a ground, a control unit, a quality control apparatus (e.g., bell, light, alarm, shut-off apparatus, programmable logic controller, and the like), and any appropriate structure(s) for identifying the condition/position of the switch 251.

The push-pin assembly 24 of FIGS. 6A–6B is designed to function as an electrical switch to monitor the position for the contact pin 250 relative to the body 260 (or to the axis 242). A certain change in the relative position of the contact pin 250 and the body 260 may be indicative of a structural failure of the vibration damper 270, a failure of the contact pin 250 (e.g., bending), or of some other problem with the current servo writing operation. Referring specifically to FIG. 6A, the push-pin assembly 240 is illustrated in a first switch condition/position, where the integrity of one or both of the contact pin 250 and the vibration damper 270 is sufficient to maintain the contact pin shaft 252 in at least substantial alignment relative to the central, longitudinal axis 242. In this first switch condition/position, the outcropping 265 of the receptacle wall 264 can approach the shaft 252 of the contact pin 250, but there is enough separation between the shaft 252 and the outcropping 265 to sustain electrical isolation of the contact pin 250 relative to the body 260. Therefore, this is an "open switch" position. The vibration damper 270 is designed to extend into the contact pin receptacle 262 far enough to maintain a desired positioning of the contact pin 250 relative to the body 260, yet remain toward the upper portion of the contact pin receptacle 262 to enable the contact pin 250 to pivot about the vibration damper 270 upon the vibration damper 270 losing structural integrity. Both the contact pin 250 and the body 260 are preferably electrical conductors (e.g., metals).

Referring to FIG. 6B, the shaft 252 of the contact pin 250 has tilted about/within the vibration damper 270 due, for instance, due to one or more of the biasing force of the positioning arm 34 against the actuator arm assembly 16, the biasing force of the VCM 24 pushing back on the push-pin assembly 240, and the contact head 254 being subject to resonance from the push-pin assembly/actuator arm assembly interface. In any case, the shaft 252 of the contact pin 250 has tilted to such a degree that a lower portion of the shaft 252 is abutting or in contact with the outcropping 265 of the receptacle wall 264, thus closing the switch. The switch closing allows electrical current to travel between the body 260 and the contact pin 250, and the condition or change in conditions may be readily identified by the circuit components 272. Any appropriate action may be undertaken in response to identify this change in switch condition/position (e.g., to signal an alarm to alert an operator to repair/replace the push-pin assembly 240; to signal an override mechanism which shuts down the current servo writing operations).

Any relative configuration between the contact pin shaft 252 and the receptacle wall 264 that provides for open and closed switch conditions/positions is contemplated. For instance, the receptacle wall 264 need not include the outcropping 265 in order for the push-pin assembly 240 to also function as an electrical switch. For instance, the lower portion of the contact pin shaft 252 may include one or more projections (not shown) that function to decrease the amount of change in relative position between the contact pin shaft 252 and the receptacle wall 264 to change between an open and closed switch condition/position.

It should also be appreciated that it is the identification of the change of the push-pin assembly 240 between open and closed switch conditions/positions which is of importance, not necessarily the change from an open switch condition/position to a closed switch condition/position. That is, an appropriate alternative would be for the contact pin 250 to be in the desired position relative to the body 260 during a closed switch condition/position, and to associate the change to an open switch condition/position with an undesired change in the position of the contact pin 250.

Figure 7:
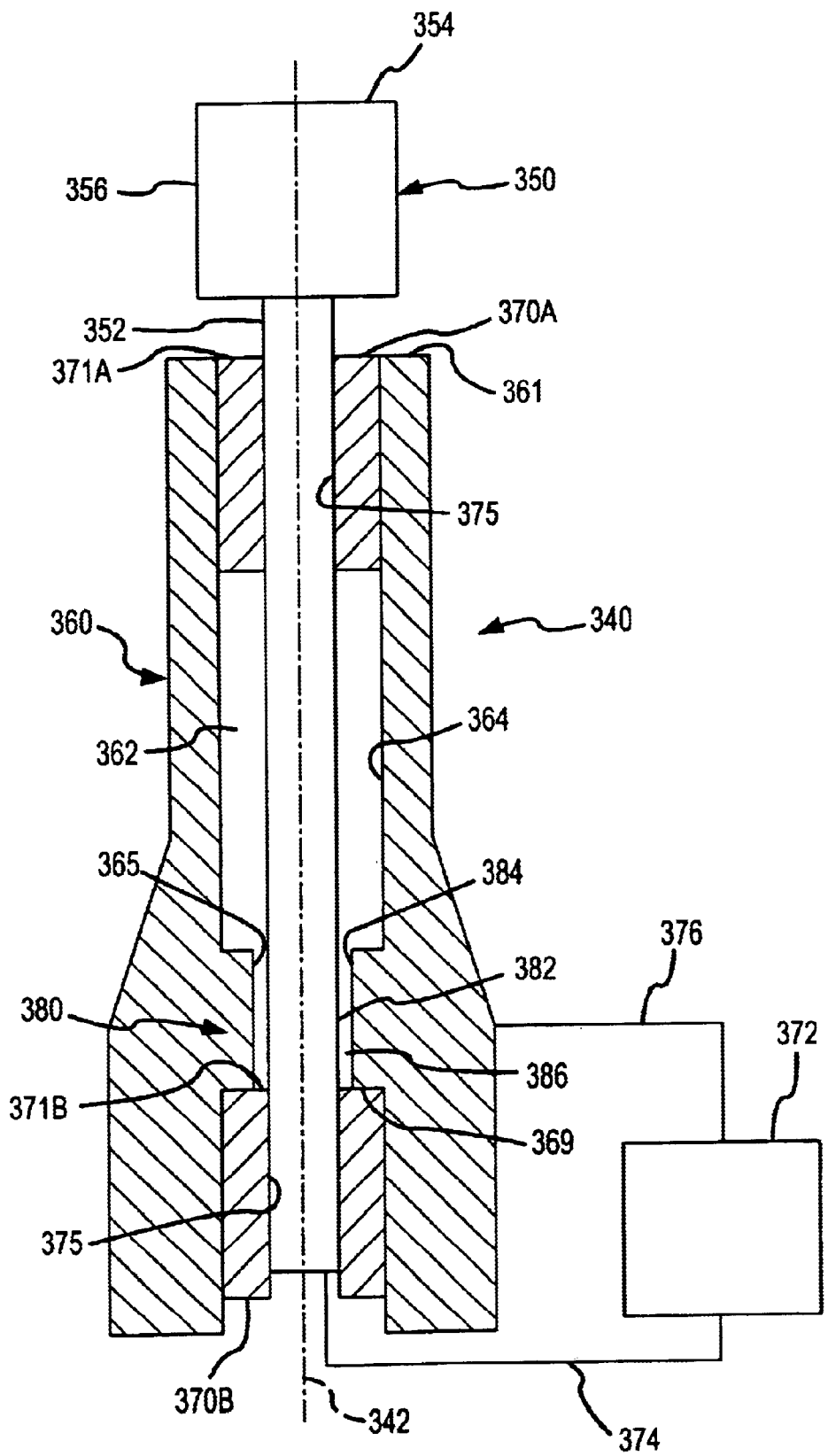
FIG. 7 is a cross-sectional view of another embodiment of a push-pin assembly which uses a pair of spaced vibration dampers.

Details regarding another embodiment of a push-pin assembly with desired vibrational damping characteristics, and which may be used in place of the push-pin assembly 40 of FIG. 3, is presented in FIG. 7. Generally, the FIG. 7 embodiment also provides a monitoring function, but in a different way than that of the push-pin assembly 240 of FIGS. 6A–B. Turning to FIG. 7, the push-pin assembly 340 has a central, longitudinal axis 342, and includes a contact pin 350, a body 360, and first and second longitudinally spaced vibration dampers 370A, 370B. Both the vibration damper 370A and the vibration damper 370B include an aperture 375 through which the contact pin shaft 352 extends at least therewithin (e.g., partially within; entirely therethrough). The first vibration damper 370A can be made from the same or different material as the second vibration damper 370B. The dampers 370A, 370B may also have the same or a different modulus of elasticity.

The contact pin 350 of the push-pin assembly 340 includes an elongate shaft 352 and a contact head 354, and the contact pin 350 is otherwise similar to pins of previously discussed FIGS. 4–6B. The body 360 includes a contact pin receptacle 362 that is defined by a receptacle wall 364, where the receptacle wall 364 is at least substantially concentrically disposed about the central, longitudinal axis 342 of the push-pin assembly 340. The receptacle wall 364 includes an outcropping 365 that narrows the cross-sectional size of the contact pin receptacle 362. The first vibration damper 370A of the push-pin assembly 340 is disposed along an upper portion of the receptacle wall 364 of the contact pin receptacle 362 such that an upper end surface 371A of first vibration damper 370A is in substantial alignment or coplanar with an upper end surface 361 of the body 360, although such is not required and in accordance with the foregoing. By contrast, the second vibration damper 370B of the push-pin assembly 340 is disposed along a lower portion of the receptacle wall 364 such that the upper end surface 371B of the second vibration damper 370B abuts a lower end surface 369 of the outcropping 365 of the receptacle wall 364. However, variations are contemplated wherein the second vibration damper 370B is positioned along various other portions of the receptacle wall 364 including, but not limited to, above the outcropping 365, along the outcropping 365, and below, but not abutting, the outcropping 365. Yet other multiple and longitudinally spaced vibration damper variations may have a receptacle wall 364 which is free of any outcropping or which has a plurality of outcroppings. Both the first vibration damper 370A and the second vibration damper 370B are tubular in shape or otherwise complimentarily sized to fit into the contact pin receptacle 362 of the body 360. As with the other embodiments of FIGS. 4–6B, the contact head 354 of the contact pin 350 is longitudinally disposed beyond the upper end surface 361 of the body 360 and the upper end surface 371 of first vibration damper 370A, or is otherwise is non-contacting relation with the body 360.

In the embodiment illustrated in FIG. 7, the first and second vibration dampers 370A, 370B preferably are made from an electrical insulating material, thus providing both electrical isolation between the contact pin 350 and the body 360, as well as structural support to the contact pin 350. This embodiment is also designed to function as a capacitive sensor to monitor the position of the contact pin 350 (e.g., relative to the body 360 or the axis 342). At least a certain change in position of the contact pin 350 may be associated with, for instance, a structural failure of one or both vibration dampers 370A, 370B. In any case, the push-pin assembly 340 defines a capacitive sensor 380 where the contact pin shaft 352 defines a first conductor 382, the outcropping 365 of the receptacle wall 364 defines a second conductor 384, and the open area between the first and second conductors 382, 384 defines a dielectric 386 which is incapable of passing electrical current but capable of passing electrical fields of force. Some variations of the capacitance embodiment of FIG. 7 do not include an outcropping 365 of the receptacle wall 364 to function as second conductor 384. In such variations, the portion of the receptacle wall 364 between the first and second vibration dampers 370A, 370B functions as the second conductor 384. Generally, any relative configuration/position between the contact pin shaft 352 and the body 360 to collectively function as a capacitive sensor may be utilized by the push-pin assembly 340.

In the embodiment of FIG. 7, a first electrical connection 374 carrying a first charge is connected to the contact pin 350, and a second electrical connection 376 carrying a second charge, opposite of the first, is connected to the body 360, preferably at or near a lower portion of the shaft 352. Generally, the electrical charge will be proportional to the voltage difference between the conductors (e.g., 382 or 384). The first and second electrical connections 374, 376 are connected to proximity detection components 372 which promote, detect, monitor, and/or measure electrical fields which pass between the body 360 and the contact pin 350, and in any case may be configured to identify a certain change in capacitance. Proximity detection components 372 can include, but are not limited to, a power source, a ground, a control unit, and a quality control apparatus (e.g., bell, light, alarm, shut-off apparatus, programmable logic controller, and the like).

It is a basic principle in the electrical arts that capacitance is directly proportional to the surface areas of the first and second conductors. Since it is also known to those of ordinary skill in the art that capacitance is indirectly proportional to the distance of separation between the first and second conductors, any lateral displacement of the shaft 352 of the contact pin 350 relative to the receptacle wall 364 will result in a change in the distance between the shaft 352 and the outcropping 365 of the receptacle wall 364, thus causing a change in capacitance and which may be readily identified by the proximity detection components 372 detecting a change in position of the shaft 352 relative to the body 360.

This change in capacitance is generally a function of separation (or lack of) which relates to a change in the electric field(s) which changes the voltage between the two conductors 382, 384. Generally, the magnitude of the electric field(s) and hence voltage is proportional to the capacitance between the body 360 and the shaft 352. Identification of such a change in the position of the contact pin shaft 352 relative to the body 360 may be used for any purpose in relation to the push-pin assembly 340, including those noted above.

Figures 8A, 8B:
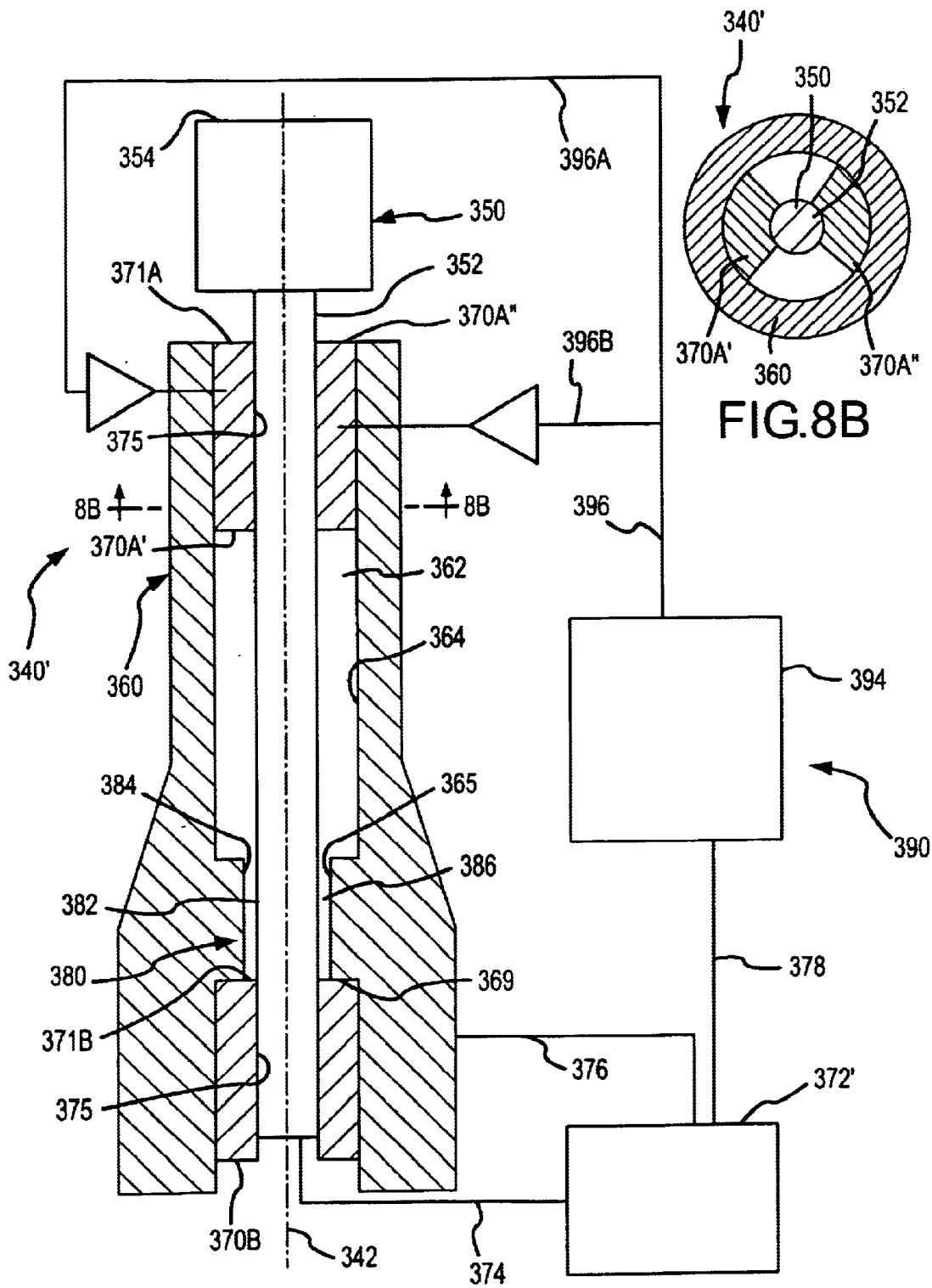
FIG. 8A is a cross-sectional view of a push-pin assembly which incorporates an exemplary diagrammatic closed-loop compensation feedback mechanism as well as an active "push-pull" vibration damper configuration.
FIG. 8B is a cross-sectional view of the push-pin assembly of FIG. 8A taken along line 8B—8B.

FIGS. 8A and 8B illustrate a variation of the push-pin assembly 340 presented in FIG. 7, and as such, a "single prime" designation is used to identify the push-pin assembly 340'. Generally, the differences between the FIG. 7 embodiment and the FIGS. 8A and 8B embodiment include the push-pin assembly 340' of FIGS. 8A and 8B having an active "push-pull"-type vibration damper exhibiting the ability to expand and/or contract one or more of the dampers 370A', 370A" based upon data collected using proximity detection components 372'. The data collected by the proximity detection components 372' is generally conveyed to a compensation controller 394 (such as a digital signal processor) via an appropriate electrical connection 378. The compensation controller 394 is interconnected via an actuation connection 396 that splits into actuation connections 396A, 396B to the respective dampers 370A', 370A". In this regard, the push-pin assembly 340' of FIGS. 8A and 8B include a closed loop compensation apparatus 390. At least the vibration dampers 370A', 370A" are made from a piezoelectric material (such as a polymer or a ceramic) capable of expanding/contracting in response to a signal from the compensation controller 394 of the closed loop compensation apparatus 390.

In general, the push-pin assembly 340' of FIGS. 8A and 8B functions as a capacitive sensor 380 which conveys signals indicative of the position of the shaft 352 relative to the body 360 along one or both connections 374, 376 to the proximity detection component(s) 372 and on to the compensation controller 394 via electrical connection 378. The compensation controller 394 can generally compare signals from the capacitive sensor 380 to a preselected nominal capacitance level (i.e., an acceptable capacitance range). Upon detecting a signal outside the range of the preselected nominal capacitance level, the compensation controller 394 can emit an actuation signal along the actuation connection 396 (and accordingly one or both 396A, 396B) to one or both vibration dampers 370A', 370A", which are made up of piezoelectric material. The piezoelectric material of dampers 370A', 370A" then either expands or contracts in response to the receipt of such an actuation signal, thus moving the contact pin 350 at least in a direction of its desired position relative to the body 360. Generally, the actuation connections (e.g., 396, 396A, 396B) leading to one or more vibration dampers (e.g., 370A', 370A") are preferably surrounded by an electrical insulator such that an actuation signal does not affect the capacitive sensor capabilities of the push-pin assembly 340'. By utilizing a plurality of vibration dampers (e.g., 370A', 370A") made of piezoelectric material and a plurality (generally equal in number to the plurality of vibration dampers) of actuation connections (e.g., 396, 396A, 396B) connected to the respective vibration dampers actuation signals can be sent to more than one vibration damper at a time, thus further enhancing the tuning characteristics of the push-pin assembly 340'. For example, referring to FIG. 8B, damper 370A' could receive a first signal causing it to expand and, (preferably, but not necessarily, simultaneously) damper 370A" could receive a second signal causing it to contract. The result would be that the shaft 352 of the contact pin 350 would be urged in a general direction coinciding with moving toward damper 370A" and away from damper 370A'. However, other appropriate adjustments can be made (such as expanding more than one damper, or contracting more than one damper). It should be appreciated that those same principles of providing a signal to change at least one physical property of at least one vibration damper could be used regardless of how a determination was made regarding an undesired change in the position of the contact pin shaft relative to the receptacle wall in the body. Some embodiments are contemplated wherein the compensation controller 394 may emit a signal (s) to a quality control apparatus (e.g., bell, light, alarm, shut-off apparatus, programmable logic controller, and the like), to alert an operator/technician of at least the potential existence of an undesired condition relating to the push-pin assembly 340'.

Figure 9:
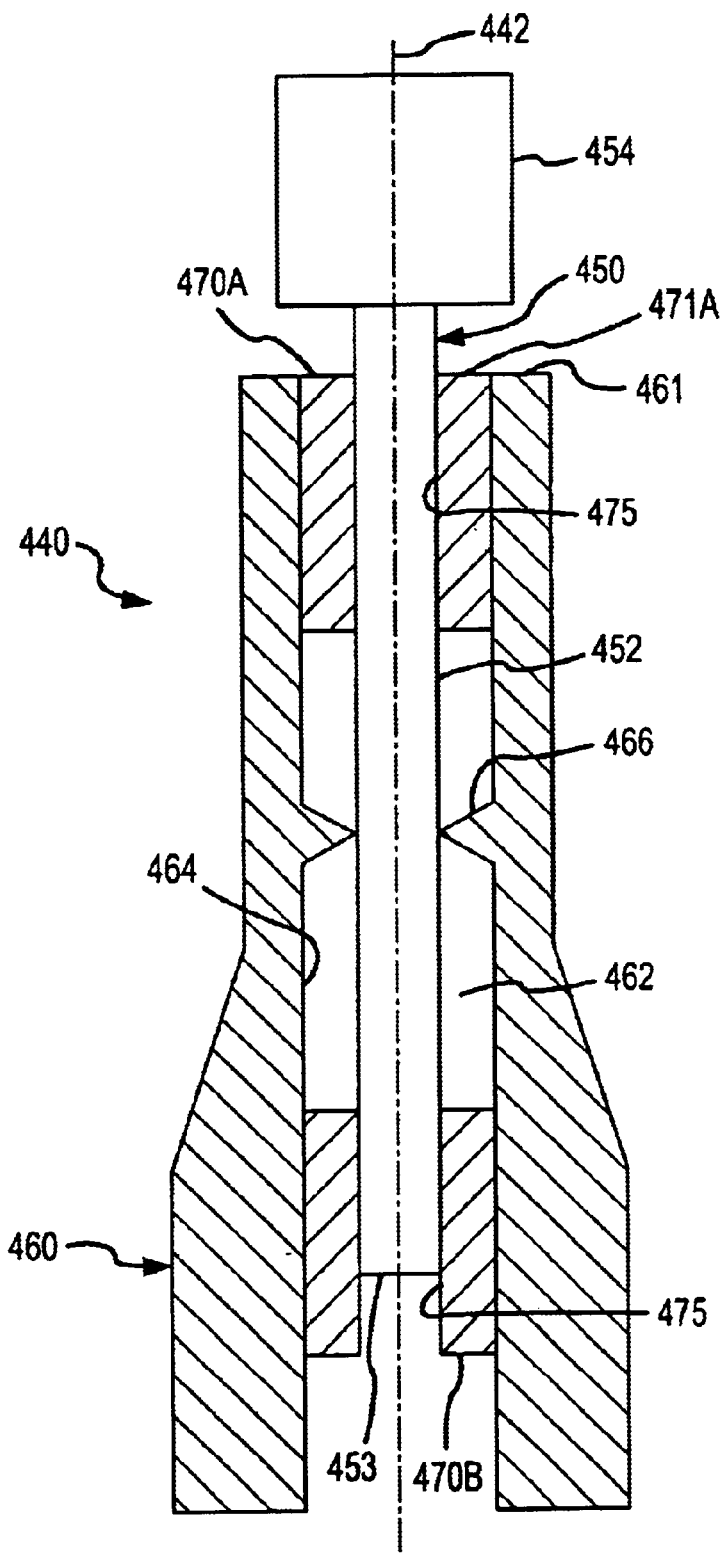
FIG. 9 is a cross-sectional view of another embodiment of a push-pin assembly that uses a fulcrum and a pair of spaced vibration dampers.

Yet another embodiment of a push-pin assembly having desired vibrational damping characteristics is illustrated in FIG. 9 and may be used in place of the push-pin assembly 40 of FIG. 3. FIG. 9 illustrates a push-pin assembly 440 having a central, longitudinal axis 442, and includes a contact pin 450 having a head 454 and a shaft 452, a body 460, and pair of longitudinally spaced vibration dampers 470A, 470B. Each vibration damper 470A, 470B includes an aperture 475 into which the contact pin shaft 452 extends. The push-pin assembly 440 of FIG. 9 differs from the previously discussed push-pin assemblies in that a receptacle wall 464, which defines a contact pin receptacle 462 of the body 460, does not include an outcropping (e.g., outcropping 365 in the FIG. 7 embodiment). Further, the vibration dampers 470A, 470B differ slightly in positioning and orientation over the embodiments of FIGS. 7 and 8. Similar to the embodiment of FIG. 7, the push-pin assembly 440 of FIG. 9 includes a first vibration damper 470A which is disposed along an upper portion of the receptacle wall 464 of the contact pin receptacle 462 such that an upper end surface 471A of the first vibration damper 470A is in substantial alignment or coplanar with the upper end surface 461 of the body 460, although such is not required and in accordance with the foregoing. However, the second vibration damper 470B is not positioned relative to an outcropping of receptacle wall 464, since no such outcropping exists in the FIG. 9 embodiment. The second vibration damper 470B instead is positioned such that the lower portion of the vibration damper 470B is longitudinally situated in the contact pin receptacle 462 such that an end 453 of the shaft 452 of the contact pin 450 that is opposite the contact head 454 terminates within the vibration damper 470B. As with some previously discussed embodiments, the material which makes up the first vibration damper 470A can be the same or different than the material which comprises the second vibration damper 470B, enabling a user a great range of flexibility in selecting damping characteristics of the push-pin assembly 440.

The receptacle wall 464 also includes a fulcrum 466 that is disposed longitudinally between the first and second vibration dampers 470A, 470B. Generally, the fulcrum 466 enables the contact pin 450 to pivot about a predetermined axis in response to some biasing force. This provides the benefit of generally imparting symmetric loading on each of the two dampers 470A, 470B. Any appropriate configuration may be used by the fulcrum 466 to provide the noted function(s). For instance, the fulcrum 466 can have an annular configuration, or may be defined by a plurality of radially spaced fulcrum segments.

Figure 10:
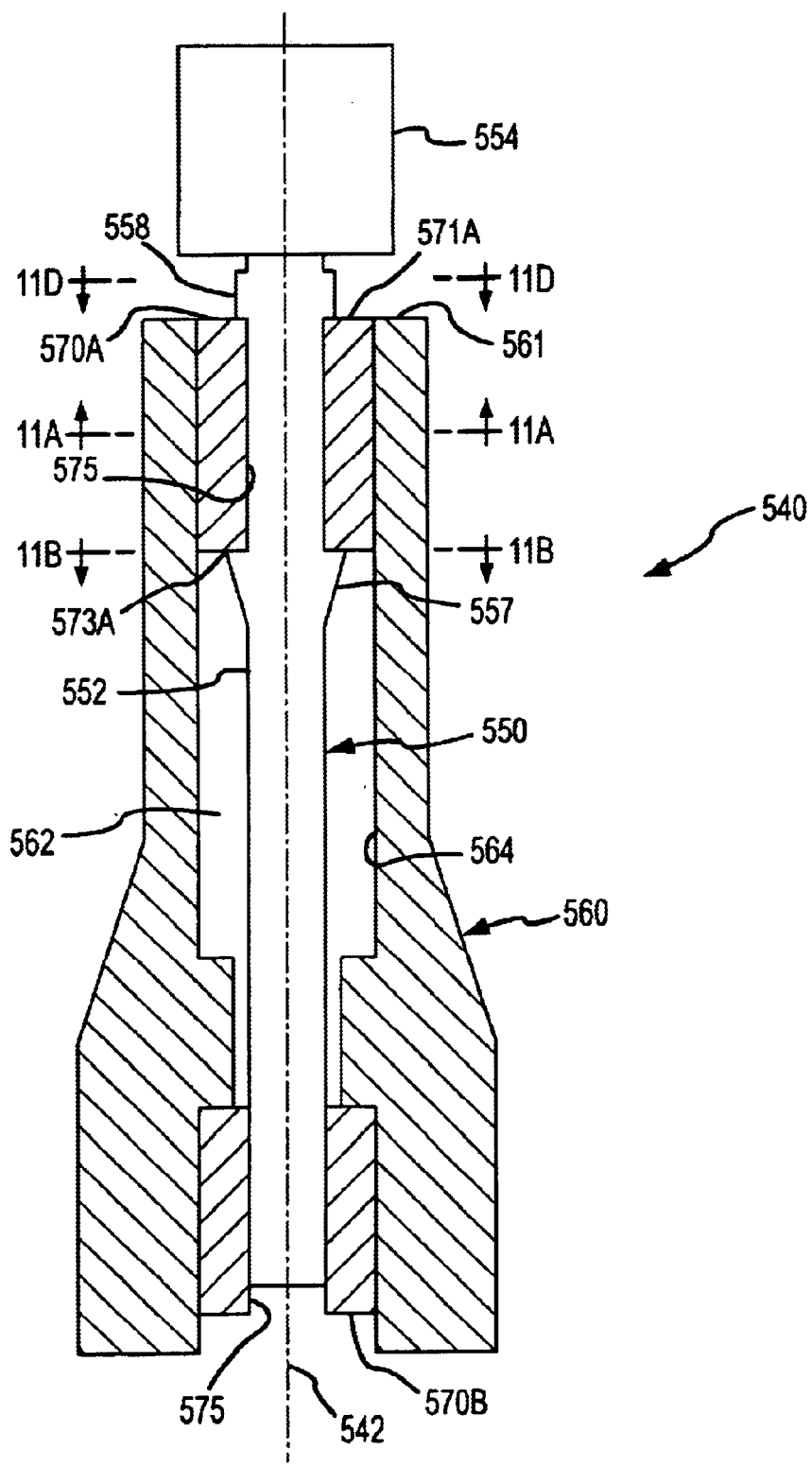
FIG. 10 is a cross-sectional view of the push-pin assembly of FIG. 7 with a contact pin retention assembly and a contact head/housing isolation assembly.

Another embodiment of a push-pin assembly demonstrating the desired vibrational damping characteristics is illustrated in FIG. 10, and may be used in place of the push-pin assembly 40 of FIG. 3. FIG. 10 illustrates a push-pin assembly 540 having a central, longitudinal axis 542, and includes a contact pin 550 having a head 554 and a shaft 552, a body 560, and pair of longitudinally spaced vibration dampers 570A, 570B. Each vibration damper 570A, 570B includes an aperture 575 into which the contact pin shaft 552 at least extends. The contact pin 550 further includes a first protrusion 557 and a second protrusion 558 that both extend outwardly from the shaft 552 of the contact pin 550. The first protrusion 557 is designed to interface with a lower end surface 573A of the vibration damper 570A, thus retaining the longitudinal positioning of the contact pin 550 and reducing the potential for the shaft 552 of the contact pin 550 pulling out of the contact pin receptacle 562. Further, the first protrusion 557 of the contact pin 550 is longitudinally tapered from its upper extremity to its lower extremity, thus enabling the contact pin shaft 552 of the contact pin 550 to be lockingly inserted into the body 560 already containing the vibration damper 570A, namely by applying a force to the contact pin 550 to direct the shaft 552 of the contact pin 350 into the contact pin receptacle 562 of the body 560, and downwardly through the aperture 575 in the damper 570A. However, such a tapered configuration of the first protrusion 557 does not readily allow the contact pin 550 to thereafter be removed from the receptacle 562 without significantly more effort and/or replacing the vibration damper 570A which interfaces with the first protrusion 557. As such, the first protrusion 557 functions as an appropriate mechanical catch of sorts for retention of the contact pin 550 within the body 560. One way of characterizing the first protrusion 557 to provide this function is that it has an effective diameter which is greater than an effective diameter of the aperture 575 in the vibration damper 570A through which the contact pin shaft 552 extends, thus providing for both vibrational isolation and positional maintenance of the contact pin 550 with respect to the contact pin receptacle 562. Any configuration for the first protrusion 557 may be utilized to allow it to provide its "mechanical catch" function. For instance, the first protrusion 557 may have an annular configuration, may be defined by a plurality of radially spaced segments, or may be a signal protrusion of less than annular extent.

The second protrusion 558 of the contact pin 550 is designed to interface with an upper end surface 571A of the first vibration damper 570A, thus providing clearance between the head 554 and the body 560. That is, the second protrusion 558 reduces the potential for the shaft 552 of contact pin 550 to move further into the contact pin receptacle 562 of the body 560 such that the head 554 engages the end surface 561 of the body 560 (e.g., so as to create a "vibrational short"). Importantly, the protrusion 558 maintains this spacing without itself contacting the body 560. The second protrusion 558 can be disposed anywhere along the outer periphery of the shaft 552 of the contact pin 550, so long as the interface between the second protrusion 558 and a respective surface results in maintaining longitudinal spacing, and thus resonance isolation, between the contact head 554 of the contact pin 550 and the upper end surface 561 of the body 560, and further so that the second protrusion 558 does not contact the body 560. In the illustrated embodiment, the effective diameter of the second protrusion 558 is less than the effective diameter of the vibration damper 570A to provide sufficient longitudinal clearance between the contact head 554 and the body 560, without having the second protrusion 558 contact the body 560.

FIG. 11A shows a cross-section of the push-pin assembly 540 of FIG. 10 taken along line 11A—11A. The shaft 552 of the contact pin 550, the contact pin receptacle 562 of the body 560, and the vibration damper 570A of the push-pin assembly 540 are shown in FIG. 11A. An effective diameter $\Delta_{562}$ of the contact pin receptacle 562 is defined by the receptacle wall 564 of the body 560 and is greater than an effective diameter $\Delta_{552}$ of the shaft 552 of the contact pin 550 that extends downwardly therewithin. The outer periphery of the vibration damper 570A is designed to conform to the receptacle wall 566 of the body 560 and thereby has an outer effective diameter that is the same as the effective diameter $\Delta_{562}$ of the contact pin receptacle 562. The aperture 575 in the vibration damper 570A through which the contact pin shaft 552 extends has an effective diameter $\Delta_{575}$ that is substantially the same as the effective diameter $\Delta_{552}$ of the corresponding portion of the contact pin shaft 552 (i.e., the portion of the contact pin shaft 552 that interfaces with an inner wall of the vibration damper 570 that defines the aperture 575).

FIG. 11B shows a cross-section of the push-pin assembly 540 of FIG. 10 taken along line 11B—11B. The protrusion 557 is annular in the illustrated configuration and has an effective diameter $\Delta_{557}$ that is greater than the effective diameter $\Delta_{575}$ of the aperture 575 in the vibration damper 570A through which the contact pin shaft 552 extends. As such, this at least provides resistance to the contact pin shaft 552 being pulled back through this aperture 575 in the vibration damper 570A. FIG. 11C illustrates an alternative configuration of a mechanical catch for the contact pin 552 in the form of a plurality of radially spaced first protrusion segments 557'. The contact pin shaft 552 at the first protrusion segments 557' has an effective diameter $\Delta_{557'}$ that is greater than the effective diameter $\Delta_{575}$ of the aperture 575 in the vibration damper 570A through which the contact pin shaft 552 extends. As such, this at least provides resistance to the contact pin shaft 252 being pulled back through this aperture in the vibration damper 570A. The effective diameter $\Delta_{557'}$ is that aperture of sorts that is collectively defined by a tangent at each of the first protrusion segments 557'.

Now referring to FIG. 11D, a cross-sectional view of the push-pin assembly 540 of FIG. 10 taken along line 11D—11D to illustrate the effective diameter of various components of the push-pin assembly 540. The second protrusion 558 has an annular configuration in the illustrated embodiment and has an effective diameter $\Delta_{558}$ which is less than the effective diameter $\Delta_{562}$ of the contact pin receptacle 562 at the upper end of the body 540, but which is greater than the effective diameter $\Delta_{575}$ of the aperture 575 in the vibration damper 570A through which the contact pin shaft 552 extends. As such, the second protrusion 558 engages the vibration damper 570A and does not engage any portion of the body 560 to maintain the contact head 554 in spaced relation to the body 560. The second protrusion 558 again could have other configurations and provide this function (e.g., a configuration corresponding with the fast protrusion segments 557' in FIG. 11C).

It should be noted that one or both a first protrusion 557 and a second protrusion 558 can be included in any of the above-described embodiments, or variations thereon, disclosed herein. Further, embodiments of the invention are contemplated which combine one or both the above-described first and second protrusions with push-pin designs known to those of ordinary skill in the art.

Figure 12B:
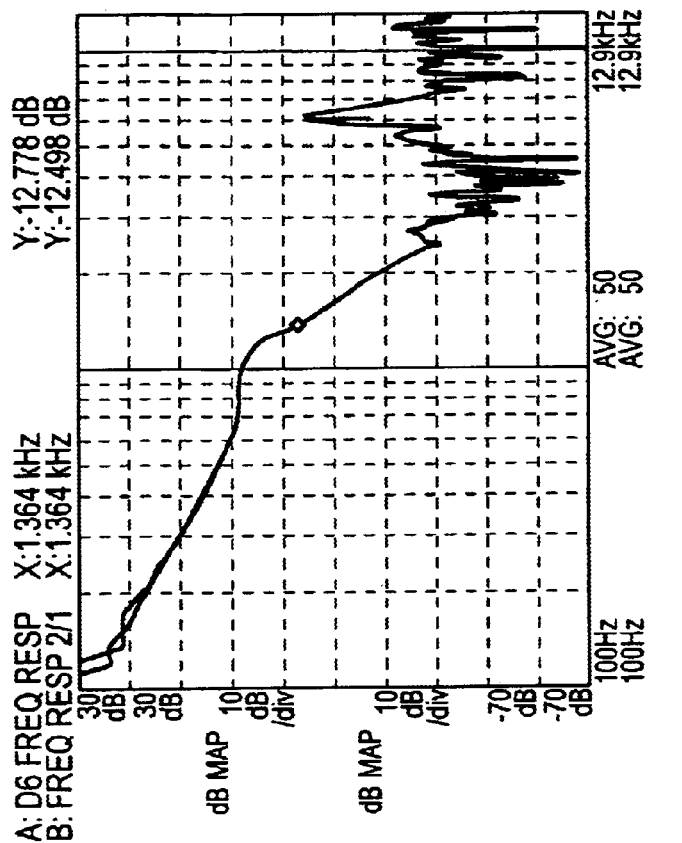
FIG. 12B shows a line graph comparatively illustrating frequency responses of the conventional push-pin of FIG. 12A and the push-pin assembly of FIGS. 4–5 after frequency adjustment.
Figure 12A:
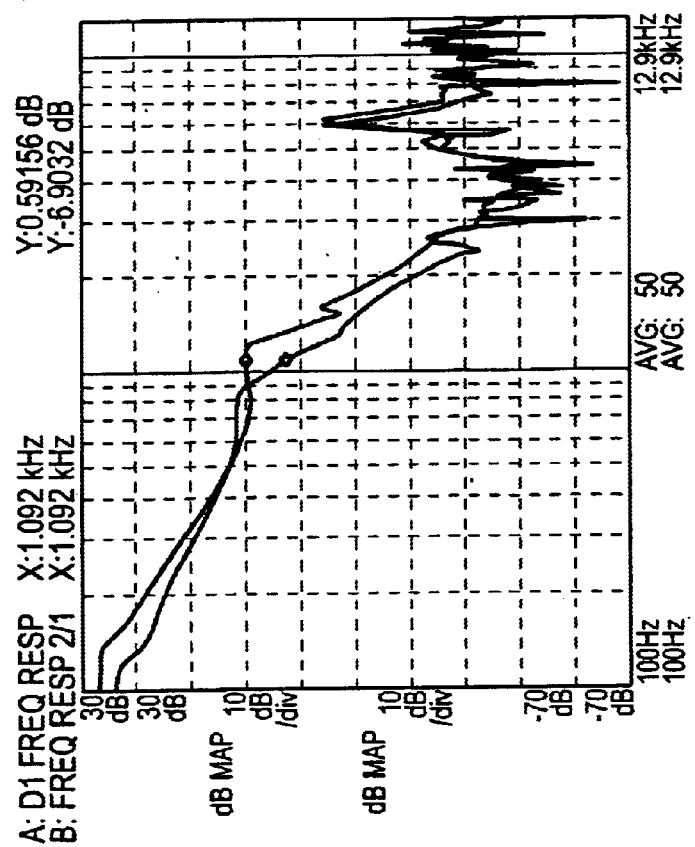
FIG. 12A shows a line graph comparatively illustrating frequency responses of a conventional push-pin and the push-pin assembly of FIGS. 4–5 before frequency adjustment.

Push-pin assemblies of the invention generally have a vibration damper which substantially deters the contact pin from transferring resonance/vibrations to the body of the push-pin assembly. Accordingly, the configuration of one or both the contact head (e.g. 154) and the shaft (e.g. 152) can be manipulated to change resonance characteristics of the contact pin (e.g. 150) without vibrationally affecting the remainder (e.g. 160, 170) of the push-pin assembly (e.g. 140). Thus, push-pin assemblies of the invention enable a user to adjust the structure of the contact pin to favorably "tune" the contact pin to a desired configuration, thus optimizing stability of the push-pin assembly, as well as the actuator arm of an accompanying disk drive. Turning now to FIGS. 12A and 12B, a frequency response of the push-pin assembly 140 of FIGS. 4 and 5, shown as the darker line having dotted-diamond, is compared to a frequency response of a conventional push-pin having a damping sleeve around the actuator arm-facing surface, shown as the lighter line having an open diamond. FIG. 12A initially seems to illustrate that the conventional push-pin reflects a greater damping effect than one configuration of the push-pin assembly 140 of FIGS. 4 and 5. However, referring to FIG. 12B, it can be observed that a modified configuration of the push-pin assembly 140 of FIGS. 4 and 5 can be "tuned" by methods including, but not limited to: adjusting the length of the vibration damper and/or contact pin; adjusting the cross-sectional thickness of one or more of the vibration damper, shaft, and contact head; and changing the material composition of the contact pin and/or vibration damper. Accordingly, frequency response of the push-pin assembly 140 can be made to mimic that of conventional push-pins having damping sleeves about the actuator arm-facing surface, as shown in FIG. 12B. However, the push-pin assembly 140 provides additional benefit in that the actuator arm/push-pin interface reflects metal-to-metal contact, thus avoiding complications associated with stiction. Each of the various push-pin assemblies having vibrational damping characteristics may be "tuned" in any desired manner.

Figures 13, 14:
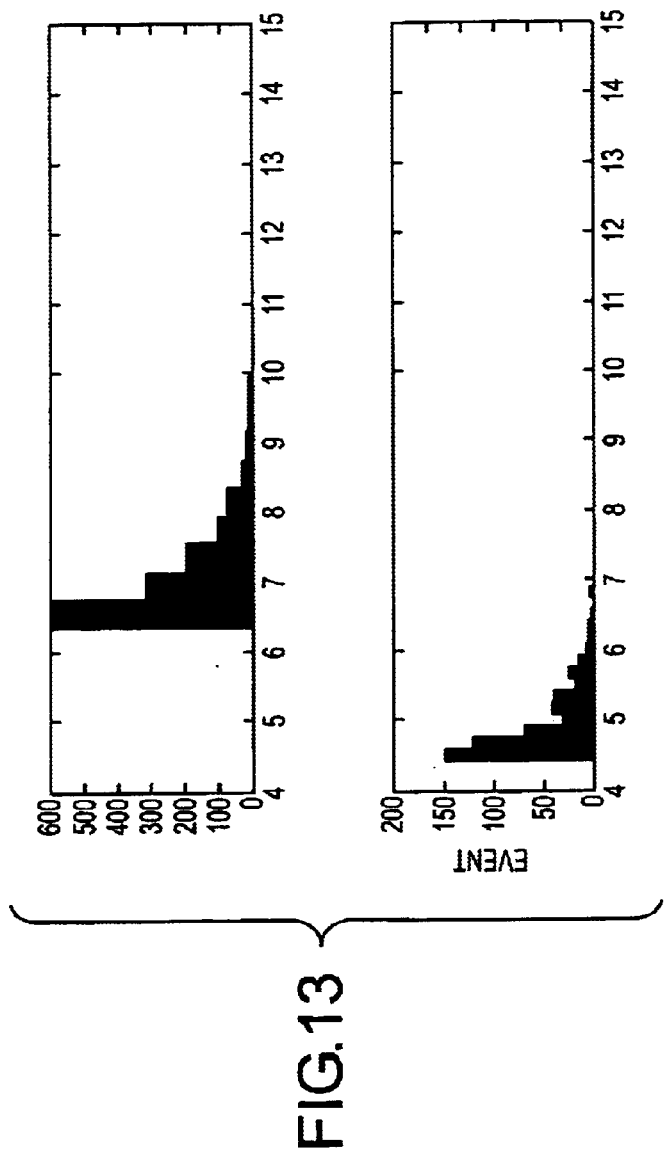
FIG. 13 shows a comparative illustration measuring "DC track squeeze" using a first histogram of a conventional push-pin and a second histogram of the push-pin assembly of FIGS. 4–5.
FIG. 14 shows a table comparing "written-in run-out" of a conventional push-pin and the push-pin assembly of FIGS. 4–5.

FIG. 13 illustrates yet another advantage to using the various push-pin assemblies which exhibit the vibrational damping described herein. These push-pin assemblies have the advantage of decoupling arm/push-pin contact surface property and structure dynamics. In other words, the contact surface area at the arm/push-pin interface can be optimized independent of the structural dynamics of one or both the arm and the push-pin assembly. FIG. 13 illustrates the results of tests that have been carried out on a conventional servo writer. The data shown reflects DC track squeeze data compiled for the conventional push-pin having a damping sleeve, and the push-pin assembly 140 of FIGS. 4 and 5. Adjacent tracks of a data storage disk are preferably separated by a desired annular distance; "DC track squeeze" is known in the art as the phenomenon associated with adjacent tracks of a data storage disk being written onto the data storage disk at a shorter annular distance of separation than the desired annular distance.

FIG. 13 illustrates DC squeeze as a function of the number of DC squeeze events that occurred versus the percentage of track pitch. Accordingly, only those events that deviated from normal nominal occurrences are displayed; in other words, the portion of the graph to the left of the shaded regions would be entirely black. The upper graph of the FIG. 13 illustrates the DC squeeze data for the conventional push-pin described above. The upper graph indicates that at least 600 occurrences of DC track squeeze were recorded between 6% and 7% of the tracks. Additionally, the conventional push-pin caused almost 100 occurrences of DC track squeeze in about 8% of the tracks. By contrast, the lower graph of FIG. 13 illustrates the DC squeeze characteristics of the push-pin assembly 140 of FIGS. 4 and 5. The lower graph reflects that DC track squeeze was about 10 occurrences between 6% and 7% of the tracks. Further, the push-pin assembly 140 of FIGS. 4 and 5 caused almost no occurrences of DC track squeeze in greater than 7% of the tracks. Thus, the push-pin assembly 140 of FIGS. 4 and 5 enables a user to write tracks onto data storage disks with more precision in regard to desired annular track spacing of adjacent tracks than conventional push-pins. Other vibrationally damped push-pin assemblies described herein should behave similarly.

Similarly, FIG. 14 illustrates the standard deviation, as a percentage of the tested track, of AC squeeze, wherein the above-described conventional push-pin is referred to as "Old push-pin", and wherein the push-pin assembly 140 of FIGS. 4 and 5 is referred to as "New push-pin". "AC track squeeze", also referred to as "written-in run-out", is known in the art as radial deviation associated with writing data on tracks of a data storage disk wherein adjacent tracks on a data storage disk are not concentric, but wavy and irregular, thus causing a specific track to have portions which are closer to a respective adjacent track than others, and portions with are farther away from the respective adjacent track than other. Data was compiled by installing the respective push-pin assemblies in five different disk drives.

By comparing the data regarding the conventional push-pin versus the data compiled for the push-pin assembly 140 of FIGS. 4 and 5, one can see that AC squeeze occurred less in disk drives which utilized the push-pin assembly 140 of FIGS. 4 and 5 rather than the conventional push-pin. Further, the improvement in the percentage of the track affected by AC squeeze observed by using the push-pin assembly 140 of FIGS. 4 and 5 varied from about 8% to less than about 37% over the amount of AC squeeze observed in conventional push-pins. Thus, the push-pin assembly 140 also enables a user to write tracks onto data storage disks with more precision in regard to the desired concentric shape of the track than conventional push-pins. Accordingly, other vibrationally damped push-pin assemblies described herein should behave similarly.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A method for making a disk drive, wherein said disk drive comprises a first disk and a first head, wherein said method comprises the steps of:
    positioning a push-pin assembly of a servo writer relative to said disk drive, wherein said push-pin assembly of said servo writer comprises:
        (a) a contact pin comprising a shaft and a contact head, wherein said contact head comprises an actuator arm facing surface engageable with a disk drive actuator arm assembly of said disk drive;
        (b) a body comprising a contact pin receptacle, wherein a first portion of said shaft of said contact pin is disposed in said contact pin receptacle such that said body is disposed about a perimeter of said first portion of said shaft of said contact pin, and wherein said contact head is disposed beyond an end of said body; and
        (c) a vibration damper disposed between at least a portion of said first portion of said shaft of said contact pin and said body, wherein an entirety of said shaft of said contact pin and said body are disposed in spaced relation;
    moving said push-pin assembly of said servo writer relative to said first disk of said disk drive and while said actuator arm facing surface of said push-pin assembly of said servo writer is engaged with said disk drive actuator arm assembly of said disk drive; and
    moving said first head of said disk drive relative to said first disk of said disk drive during said moving said push-pin assembly step, wherein a servo writing operation comprises said positioning step, said moving said push-pin assembly step, and said moving said first head step.

2. A method, as claimed in claim 1, wherein said shaft of said contact pin further comprises a protrusion disposed toward an end of said shaft opposite said contact head, wherein said vibration damper is positioned about a portion of said shaft which is disposed between said protrusion and said contact head.

3. A method, as claimed in claim 2, wherein said protrusion is annular.

4. A method, as claimed in claim 2, wherein said protrusion comprises a plurality of radially spaced protrusion segments.

5. A method, as claimed in claim 2, wherein said protrusion engages an end of said vibration damper.

6. A method, as claimed in claim 1, wherein said shaft further comprises a protrusion, wherein said protrusion is disposed between said contact head and said vibration damper.

7. A method, as claimed in claim 6, wherein said protrusion interfaces with an end of said vibration damper, and is free from contact with said body.

8. A method, as claimed in claim 6, wherein said protrusion comprises a plurality of radially spaced protrusion segments.

9. A method, as claimed in claim 6, wherein said protrusion is annular.

10. A method, as claimed in claim 1, wherein said contact pin receptacle of said body is substantially annular, wherein said first portion of said shaft of said contact pin is substantially cylindrical, and wherein said at least a portion of said first portion of said shaft of said contact pin is concentrically disposed in said contact pin receptacle of said body.

11. A method, as claimed in claim 1, further comprising means for maintaining said contact pin in a set position along a longitudinal extent of said shaft of said contact pin and relative to said body.

12. A method, as claimed in claim 1, wherein said vibration damper is annular.

13. A method, as claimed in claim 1, wherein said vibration damper comprises a plurality of radially spaced vibration damper segments.

14. A method, as claimed in claim 1, wherein said vibration damper is formed from a material selected from the group consisting of urethane materials, polyurethane materials, piezoelectric materials, and combinations thereof.

15. A method, as claimed in claim 1, wherein a portion of said shaft of said contact pin extends beyond an end of said vibration damper within said contact pin receptacle.

16. A method, as claimed in claim 1, wherein said contact pin receptacle comprises a first longitudinal receptacle section and a second longitudinal receptacle section, wherein said first longitudinal receptacle section has a larger effective diameter than said second longitudinal receptacle section such that a first spacing between a first wall of said first longitudinal receptacle section and said shaft is greater than a second spacing between a second wall of said second longitudinal receptacle section and said shaft.

17. A method, as claimed in claim 16, wherein said vibration damper is disposed in said first longitudinal receptacle section, wherein a length of said vibration damper is less than a length of said first longitudinal receptacle section.

18. A method, as claimed in claim 16, wherein said shaft extends within both said first and second longitudinal receptacle sections.

19. A method, as claimed in claim 16, wherein said vibration damper comprises first and second longitudinally spaced vibration dampers, wherein said first vibration damper is disposed within said first longitudinal receptacle section, and wherein said second longitudinal receptacle section is disposed between said first longitudinal receptacle section and said second vibration damper.

20. A method, as claimed in claim 1, wherein said vibration damper comprises first and second vibration dampers which are spaced along a longitudinal extent of said shaft of said contact pin.

21. A method, as claimed in claim 20, wherein said first vibration damper has a modulus of elasticity which is less than, substantially equal to, or greater than a modulus of elasticity of said second vibration damper.

22. A method, as claimed in claim 20, wherein said first vibration damper comprises a different material than that of said second vibration damper.

23. A method, as claimed in claim 20, wherein said first vibration damper and said second vibration damper comprise the same material.

24. A method, as claimed in claim 20, wherein at least one of said first vibration damper and said second vibration damper comprises a piezoelectric material.

25. A method, as claimed in claim 24, wherein said push-pin assembly further comprises means for providing an electrical signal to said piezoelectric material to change at least one physical property of said piezoelectric material.

26. A method, as claimed in claim 20, wherein said second vibration damper is disposed about and longitudinally extends beyond an end of said shaft opposite said contact head.

27. A method, as claimed in claim 1, wherein said vibration damper is an electrical insulator.

28. A method, as claimed in claim 27, wherein said shaft comprises a first conductor of a capacitive sensor, said body comprises a second conductor of said capacitive sensor, and a first open area comprises a dielectric of said capacitive sensor, wherein said first open area is devoid of said vibration damper and is defined between said said shaft and said body.

29. A method, as claimed in claim 1, wherein said push-pin assembly further comprises a means for monitoring a position of said shaft of said contact pin relative to said body.

30. A method, as claimed in claim 29, wherein said means for monitoring a position of said shaft comprises a capacitive sensor, wherein said shaft comprises a first conductor of said capacitive sensor, said body comprises a second conductor of said capacitive sensor, and a first open area comprises a dielectric of said capacitive sensor, wherein said first open area is devoid of said vibration damper and is defined between said shaft and said body, such that failure of said vibration damper results in said shaft being repositioned relative to said body, and thus causing a change in capacitance.

31. A method for making a disk drive, wherein said disk drive comprises a first disk and a first head, wherein said method comprises the steps of:

positioning a push-pin assembly of a servo writer relative to said disk drive, wherein said push-pin assembly of said servo writer comprises:
(a) a contact pin comprising a shaft and a contact head, wherein said contact head comprises an actuator arm facing surface engageable with a disk drive actuator arm assembly of said disk drive;
(b) a body comprising a receptacle wall defining a contact pin receptacle, wherein a first portion of said shaft of said contact pin is disposed in said contact pin receptacle such that at least part of said receptacle wall of said body is disposed about a perimeter of said first portion of said shaft of said contact pin, and wherein said contact head is disposed beyond an end of said body; and
(c) a vibration damper disposed between at least a first longitudinal segment of said first portion of said shaft of said contact pin and said receptacle wall of said body, wherein an open area separates a second longitudinal segment of said first portion of said shaft from said receptacle wall of said body;
moving said push-pin assembly of said servo writer relative to said first disk of said disk drive and while said actuator arm facing surface of said push-pin assembly of said servo writer is engaged with said disk drive actuator arm assembly of said disk drive; and
moving said first head of said disk drive relative to said first disk of said disk drive during said moving said push-pin assembly step, wherein a servo writing operation comprises said positioning step, said moving said push-pin assembly step, and said moving said first head step.

32. A method for making a disk drive, wherein said disk drive comprises a first disk and a first head, wherein said method comprises the steps of:
positioning a push-pin assembly of a servo writer relative to said disk drive, wherein said push-pin assembly of said servo writer comprises:
(a) a contact pin comprising:
(i) a contact head comprising an outer surface engageable with a disk drive actuator arm assembly of said disk drive, and
(ii) a shaft comprising a first protrusion spaced from said contact head;
(b) a body comprising a contact pin receptacle, wherein a first portion of said shaft of said contact pin is disposed in said contact pin receptacle such that said body is disposed about a perimeter of said first portion of said shaft of said contact pin, and wherein said contact head is disposed beyond an end of said body; and
(c) a vibration damper disposed about a portion of said shaft located between said contact head and said first protrusion;
moving said push-pin assembly of said servo writer relative to said first disk of said disk drive and while said outer surface of said push-pin assembly of said servo writer is engaged with said disk drive actuator arm assembly of said disk drive; and
moving said first head of said disk drive relative to said first disk during said moving said push-pin assembly step, wherein a servo writing operation comprises said positioning step, said moving said push-pin assembly step, and said moving said first head step.

33. A method, as claimed in claim 32, wherein said first protrusion of said shaft has an effective diameter larger than an effective diameter of said vibration damper.

34. A method, as claimed in claim 32, wherein said first protrusion engages a first end surface of said vibration damper.

35. A method, as claimed in claim 32, wherein said first protrusion comprises a plurality of radially spaced first protrusion segments.

36. A method, as claimed in claim 32, wherein said first protrusion is annular.

37. A method, as claimed in claim 32, wherein said first protrusion comprises means for maintaining said contact pin in a set position relative to said body.

38. A method, as claimed in claim 32, wherein said shaft further comprises a second protrusion disposed between said contact head and said vibration damper.

39. A method, as claimed in claim 38, wherein said second protrusion interfaces with an end of said vibration damper, and is free from contact with said body.

40. A method, as claimed in claim 38, wherein said first protrusion interfaces with a first end of said vibration damper, and said second protrusion interfaces with a second end, opposite said first end, of said vibration damper, and wherein both said first and second protrusions are free from contact with said body.

41. A method, as claimed in claim 38, wherein said second protrusion comprises a plurality of radially spaced second protrusion segments.

42. A method, as claimed in claim 38, wherein said second protrusion is annular.

43. A method, as claimed in claim 38, wherein said second protrusion comprises means for preventing contact between said contact head and said body.

44. A method for making a disk drive, wherein said disk drive comprises a first disk and a first head, wherein said method comprises the steps of:
  positioning a push-pin assembly of a servo writer relative to said disk drive, wherein said push-pin assembly of said servo writer comprises:
  (a) a contact pin comprising a shaft and a contact head, wherein said contact head comprises an actuator arm facing surface engageable with a disk drive actuator arm assembly of said disk drive;
  (b) a body comprising a receptacle wall defining a contact pin receptacle, wherein a first portion of said shaft of said contact pin is disposed in said contact pin receptacle such that at least part of said receptacle wall of said body is disposed about a perimeter of said first portion of said shaft of said contact pin, and wherein said contact head is disposed beyond an end of said body, and
  (c) first and second longitudinally spaced vibration dampers disposed between said first portion of said shaft of said contact pin and said receptacle wall of said body, wherein at least a portion of said shaft longitudinally oriented between said first and second vibration dampers is separated from said receptacle wall by an open area devoid of vibration dampers;
    moving said push-pin assembly of said servo writer relative to said first disk of said disk drive and while said actuator arm facing surface of said push-pin assembly of said servo writer is engaged with said disk drive actuator arm assembly of said disk drive; and
    moving said first head of said disk drive relative to said first disk of said disk drive during said moving said push-pin assembly step, wherein a servo writing operation comprises said positioning step, said moving said push-pin assembly step, and said moving said first head step.

45. A method, as claimed in claim 44, wherein said first and second vibration dampers are electrical insulators.

46. A method, as claimed in claim 45, wherein said shaft comprises a first conductor of a capacitive sensor, said receptacle wall of said body comprises a second conductor of said capacitive sensor, and said open area comprises a dielectric of said capacitive sensor.

47. A method, as claimed in claim 44, wherein at least one of said first vibration damper and said second vibration damper is a piezoelectric material.

48. A method, as claimed in claim 47, wherein said push-pin assembly further comprises means for providing an electrical signal to said piezoelectric material to change at least one physical property of said piezoelectric material.

49. A method, as claimed in claim 44, wherein said body further comprises a fulcrum on said receptacle wall at a longitudinal position which is between said first and second vibration dampers.

50. A method, as claimed in claim 44, wherein said push-pin assembly further comprises means for monitoring a position of said shaft of said contact pin relative to said receptacle wall of said body.

51. A method making a disk drive, wherein said disk drive comprises a first disk and a first head, wherein said method comprises the steps of:
  positioning a push-pin assembly of a servo writer relative to said disk drive, wherein said push-pin assembly of said servo writer comprises:
  (a) a contact pin comprising:
    (i) a contact head comprising an outer surface engageable with a disk drive actuator arm assembly of said disk drive, and
    (ii) a shaft comprising a protrusion;
  (b) a body comprising a contact pin receptacle, wherein a first portion of said shaft of said contact pin is disposed in said contact pin receptacle such that said body is disposed about a perimeter of said first portion of said shaft of said contact pin, and wherein said contact head is disposed beyond an end of said body; and
  (c) a vibration damper disposed about a portion of said shaft, wherein said protrusion is located between said contact head and said vibration damper;
    moving said push-pin assembly of said servo writer relative to said first disk of said disk drive and while said outer surface of said push-pin assembly of said servo writer is engaged with said disk drive actuator arm assembly of said disk drive; and
    moving said first head of said disk drive relative to said first disk of said disk drive during said moving said push-pin assembly step, wherein a servo writing operation comprises said positioning step, said moving said push-pin assembly step, and said moving said first head step.

52. A method, as claimed in claim 51, wherein said protrusion interfaces with an end of said vibration damper, and is free from contact with said body.

53. A method, as claimed in claim 51, wherein said protrusion comprises means for preventing contact between said contact head and said body.

54. A method for making a disk drive, wherein said disk drive comprises a first disk and a first head, wherein said method comprises the steps of:
  positioning a push-pin assembly of a servo writer relative to said disk drive, wherein said push-pin assembly of said servo writer comprises:
  (a) a contact pin comprising a shaft and a contact head, wherein said contact head comprises an actuator arm facing surface engageable with a disk drive actuator arm assembly of said disk drive;
  (b) a body comprising a contact pin receptacle, wherein at least a portion of said shaft of said contact pin is disposed in said contact pin receptacle such that said body is disposed about a perimeter of said at least a portion of said shaft of said contact pin, and wherein said contact head is disposed beyond an end of said body; and (c) a vibration damper disposed between said shaft of said contact pin and said body, wherein said vibration damper comprises a means for maintaining said contact pin in a set position along a longitudinal extent of said shaft of said contact pin and relative to said body;

moving said push-pin assembly of said servo writer relative to said first disk of said disk drive and while said actuator arm facing surface of said push-pin assembly of said servo writer is engaged with said disk drive actuator arm assembly of said disk drive; and moving said first head of said disk drive relative to said first disk of said disk drive during said moving said push-pin assembly step, wherein a servo writing operation comprises said positioning step, said moving said push-pin assembly step, and said moving said first head step.

* * * * *